United States Patent
Bleyer et al.

(10) Patent No.: US 11,620,734 B2
(45) Date of Patent: *Apr. 4, 2023

(54) MACHINE-LEARNED DEPTH DEALIASING

(71) Applicant: Microsoft Technology Licensing, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/168,373

(22) Filed: Feb. 5, 2021

(65) Prior Publication Data
US 2021/0174474 A1   Jun. 10, 2021

Related U.S. Application Data

(63) Continuation of application No. 16/460,321, filed on Jul. 2, 2019, now Pat. No. 10,929,956.

(51) Int. Cl.
| | |
|---|---|
| G06K 9/00 | (2022.01) |
| G06T 5/00 | (2006.01) |
| G06T 7/50 | (2017.01) |
| G01S 17/26 | (2020.01) |
| G01S 17/89 | (2020.01) |
| G06N 20/00 | (2019.01) |

(52) U.S. Cl.
CPC .............. *G06T 5/002* (2013.01); *G01S 17/26* (2020.01); *G01S 17/89* (2013.01); *G06T 7/50* (2017.01); *G06N 20/00* (2019.01); *G06T 2207/10048* (2013.01); *G06T 2207/20081* (2013.01)

(58) Field of Classification Search
None
See application file for complete search history.

(56) References Cited

U.S. PATENT DOCUMENTS

2020/0301014 A1 *   9/2020   Schoenlieb ........... G01S 7/4808

* cited by examiner

*Primary Examiner* — Soo Jin Park
(74) *Attorney, Agent, or Firm* — Workman Nydegger

(57) ABSTRACT

Techniques for de-aliasing depth ambiguities included within infrared phase depth images are described herein. An illuminator emits reference light towards a target object. Some of this light is reflected back and detected. A phase image is generated based on phase differences between the reference light and the reflected light. The phase differences represent changes in depth within overlapping sinusoidal periods of the reference and reflected light. The phase image also includes ambiguities because multiple different depths within the phase image share the same phase difference value, even though these depths actually correspond to different real-world depths. The phase image is fed as input to a machine learning ("ML") component, which is configured to de-alias the ambiguities by determining, for each pixel in the phase image, a corresponding de-aliasing interval. A depth map is generated based on the phase image and any de-aliasing intervals generated by the ML component.

20 Claims, 17 Drawing Sheets

MACHINE-LEARNED DEPTH DEALIASING

CROSS-REFERENCE TO RELATED APPLICATIONS

This application is a continuation of U.S. patent application Ser. No. 16/460,321 filed on Jul. 2, 2019, entitled "Machine-Learned Depth Dealiasing," which application is expressly incorporated herein by reference in its entirety.

BACKGROUND

Mixed-reality ("MR") systems, which include virtual-reality ("VR") and augmented-reality ("AR") systems, have received significant attention because of their ability to create truly unique experiences for their users. For reference, conventional VR systems create completely immersive experiences by restricting users' views to only VR environments. This is often achieved through the use of head-mounted devices ("HMD") that completely block views of the real world. Consequently, a user is entirely immersed within the VR environment. In contrast, conventional AR systems create AR experiences by visually presenting virtual images (i.e. "holograms") that are placed in or that interact with the real world.

As used herein, VR and AR systems are described and referenced interchangeably. Unless stated otherwise, the descriptions herein apply equally to all types of MR systems, which (as detailed above) include AR systems, VR systems, and/or any other similar system capable of displaying virtual images. As used herein, the term "virtual image" collectively refers to images rendered within a VR environment as well as images/holograms rendered in an AR environment.

Some of the disclosed MR systems use one or more on-body devices (e.g., the HMD, a handheld device, etc.). The HMD provides a display that enables a user to view overlapping and/or integrated visual information in whatever environment the user is in, be it a VR environment, an AR environment, or any other type of environment. Continued advances in hardware capabilities and rendering technologies have greatly improved how MR systems are able to capture complex 3D geometries and render virtual representations of captured or computed images.

To capture these complex 3D geometries, the MR system relies on depth information generated by the MR system's depth estimation system. For instance, the MR system can not only determine the relative distance between the MR system and a particular object, but it can also use depth information to identify specific contours, edges, bends, shapes, and any other geometries of objects within the MR system's surrounding environment. There are a vast number of different types of depth estimation systems. Some examples of such systems include stereoscopic depth estimation systems, such as active stereo and passive stereo, time-of-flight ("ToF") systems, sheet of light triangulation, point-to-point laser scanning, and interferometry, just to name a few.

ToF systems are becoming increasingly popular because of their ability to scan an entire environment in three dimensions using light pulses, as opposed to using point-to-point techniques. One drawback to the current ToF technology, however, is the large number of infrared (IR) images they need to capture in order to compute a single depth map or surface mesh. Using more images results in significant increases to power consumption, thereby reducing the MR system's battery life. As such, there is an on-going need to increase the MR system's battery life while continuing to provide a high-quality MR experience by producing high-quality depth information for depth maps/surface meshes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some of the disclosed embodiments are directed towards systems, methods, and head-mounted devices ("HMD") that improve depth estimation operations by de-aliasing depth ambiguities included within infrared phase depth images. The embodiments may be practiced in any type of scenario requiring the use of depth information. Such scenarios include, but are not limited to, mixed-reality scenarios, automated vehicle scenarios, and countless other scenarios.

In some embodiments, an illuminator is caused to emit reference light towards a target object. In response, reflected light is detected, where the reflected light comprises a portion of the reference light that is reflected off of the target object. A phase image is then generated. The process of generating the phase image is based on phase differences between the reference light and the reflected light. Here, the phase differences represent changes in depth within overlapping sinusoidal periods of the reference light and the reflected light. Additionally, the phase image includes ambiguities because multiple different depths represented by the phase image share a same phase difference/shift value, even though those different depths actually correspond to different real-world depths. The phase image is then fed as input into a machine learning ("ML") component. The ML component is specially configured to de-alias the ambiguities in the phase shift information. In performing its de-aliasing operations, the ML component determines, for each pixel in the phase image, a corresponding de-aliasing interval (e.g., a number of times the sinusoidal period of the reference light cycled or wrapped prior to reaching the target object). A depth map (or surface mesh) is then generated based on the phase image and any resulting de-aliasing intervals generated by the ML component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
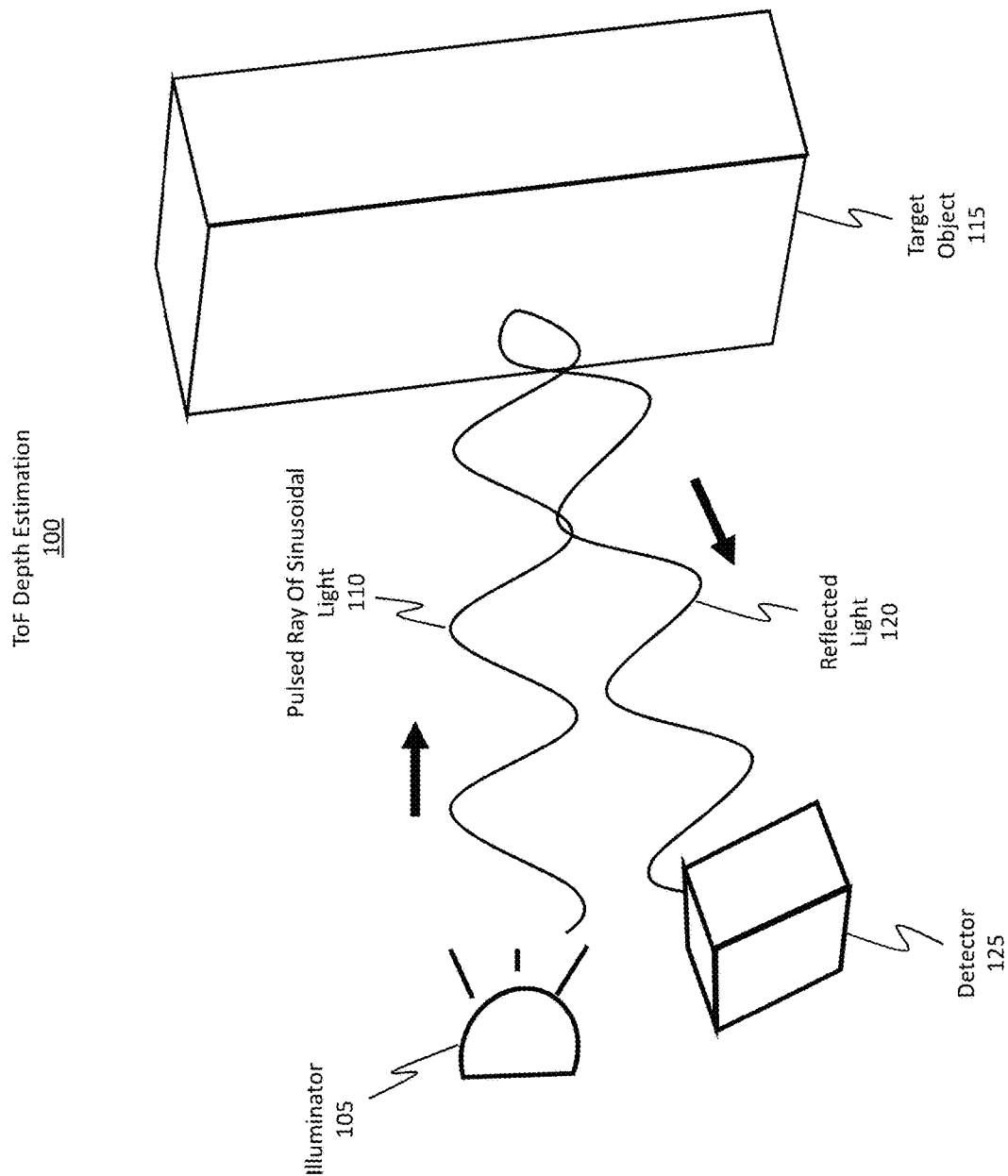
FIG. 1 illustrates an example of a type of phase-based/quasi-CW (continuous wave) time-of-flight ("ToF") depth estimation system that emits a pulsed ray of sinusoidal light to determine how far away an object is relative to another object.

Some of the disclosed embodiments are directed towards systems, methods, and head-mounted devices ("HMD") that improve depth estimation by de-aliasing depth ambiguities found within infrared phase depth images. The embodiments may be practiced in any type of scenario requiring the use of depth information. Such scenarios include, but are not limited to, mixed-reality scenarios, automated or self-driving vehicle scenarios, and countless other scenarios.

In some embodiments, an illuminator emits reference light towards a target object, thereby producing reflected light, which is then detected. A phase image is generated using phase differences/shifts between the reference light and the reflected light. The phase differences represent changes in depth within overlapping sinusoidal periods of the reference and reflected light. The phase image includes ambiguities because multiple different depths represented within the phase image share a same phase difference/shift value. The phase image is then fed as input into a machine learning ("ML") component that is configured to de-alias the depth ambiguities in the phase image. To do so, the ML component determines, for each pixel in the phase image, a corresponding de-aliasing interval. A depth map/surface mesh is generated based on the phase image and any resulting de-aliasing intervals generated by the ML component.

Technical Benefits and Advantages

Utilizing the disclosed embodiments, it is possible to significantly reduce how much power is consumed by time-of-flight ("ToF") depth imaging and depth calculation systems while performing depth map generation or point cloud generation (or perhaps even surface reconstruction), thereby reducing system power consumption and prolonging MR system operational time and also, thereby, improving overall consumer experience and satisfaction.

As described earlier, MR systems project virtual images for a user to view and interact with. Surface reconstruction represents an essential part of MR systems because the resulting surface mesh provides the initial framework for deciding where and how to project virtual images. Surface reconstruction relies on depth information captured by the MR system's depth estimation system. Unfortunately, the depth detection and calculation processes can consume significant amounts of power, resulting in substantial drains to the MR system's battery.

Significant improvements and technical benefits may be realized by practicing the disclosed embodiments. These improvements include substantially reducing battery consumption, increasing MR environment/scene immersion and timespans, and improving user experiences (e.g., because the user can be immersed in the environment/scene for a longer period of time). It should be noted that the disclosed embodiments do not simply reduce the rate at which depth estimators are used in order to preserve battery life. Rather, the disclosed embodiments additionally, or alternatively, reduce the number of images captured by the depth estimation system in order to achieve these benefits. For instance, the number of phase images that are generated can be reduced from 9 or 6 images even down to 3, 2, or potentially even 1 image, thereby achieving significant power reductions and less data processing, storage, and transfer.

The disclosed embodiments also reduce the laser illumination time required to achieve a depth and operate to extend the longevity of infrared illuminators as a result of those illuminators being used less frequently and/or less intensely. Indeed, traditional illuminators struggle to have a sufficient lifetime for years of continuous operations. The disclosed embodiments, on the other hand, provide substantial benefits because they extend the lifetime of these illuminators as a result of their reduced usage.

Additional benefits provided by the disclosed embodiments include the ability to extend the range of the depth estimation system. For instance, by using the disclosed de-aliasing intervals, the embodiments are able to accurately de-alias depth ambiguities up to 6 meters away from the depth estimation system. In some cases, this range can be extended even further, such as potentially up to 14 meters. Using the machine learning features disclosed herein, in some embodiments, there is no upper limit on depth range. As such, some of the disclosed embodiments can estimate depth even further than 14 meters, such as, for example, 15 meters, 16 m, 17 m, 18 m, 19 m, 20 m, and even further than 20 m. The disclosed embodiments are highly versatile and can use head-tracking phase images, hand tracking phase images, or any combination of head and hand tracking images. It should be noted that typically, head-tracking images have a longer detectable depth range as compared to hand tracking images.

ToF Depth Estimation

Attention will now be directed to FIG. 1, which illustrates an example ToF depth estimation 100 process. Here, an illuminator 105 is pulsed at a particular frequency so as to generate a pulsed ray of sinusoidal light 110. Often, the frequency of this pulsed ray(s) of sinusoidal light 110 is within a range between 100 MHz and 300 MHz, though other frequency values may be used. For example, the frequency can be as low as 5 MHz or as high as 500 MHz.

Illuminator 105 can be any type of light emitting device. Examples include, but are not limited to, an infrared ("IR") laser or laser diode, an IR light-emitting diode ("LED"), or any other type of device capable of emitting sinusoidal IR light in multiple directions (or perhaps even in a single direction, such as in point-to-point applications).

The pulsed ray of sinusoidal light 110 hits an object (e.g., target object 115), and a portion of the pulsed ray of sinusoidal light 110 is reflected in the form of reflected light 120. The reflected light 120 is then detected by a detector 125. Detector 125 can be any type of light detecting device. Examples of a light detecting device include, but are not limited to, a CMOS camera, an IR camera, a charge-coupled-device ("CCD") camera, an IR/RGB combination camera, or any other type of camera capable of detecting reflected IR light waves. Often, the illuminator 105 and the detector 125 will be included within the same housing or detection/estimation unit. Sometimes, however, the illuminator 105 and the detector 125 may be included in different units, but the relative distance between the two units is known.

The distance from the depth estimation unit, which may include the illuminator 105 and the detector 125, to the target object 115 is determined by comparing the properties, characteristics, or attributes of the received reflected light 120 against the properties, characteristics, or attributes of the pulsed ray of sinusoidal light 110. In particular, the depth estimation system/unit identifies any phase differences (aka phase shifts) between the two signals. These phase differences are representative of the depth or distance between the depth estimation system and the target object 115, as described in more detail in FIG. 2.

Figure 2:
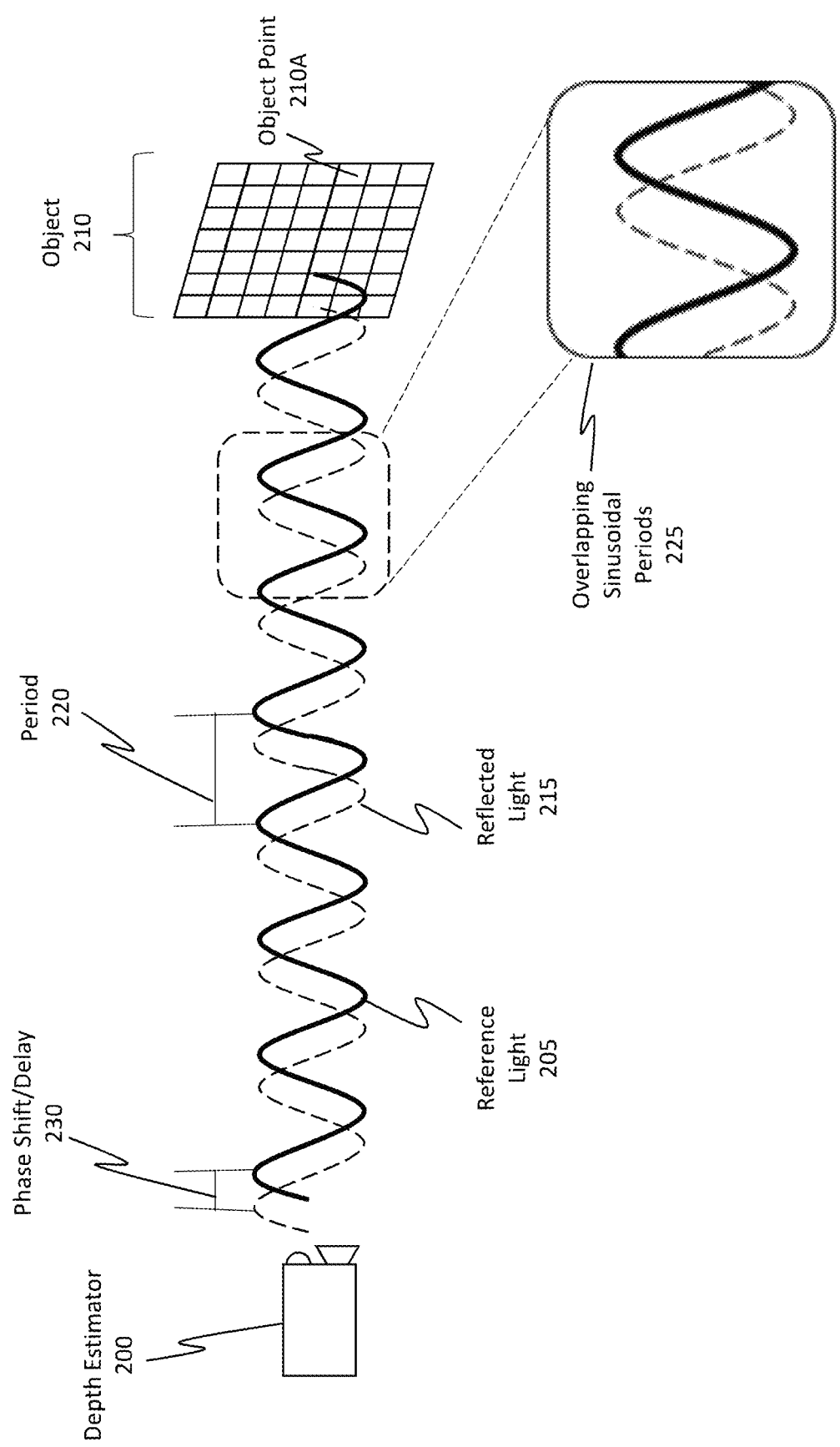
FIG. 2 illustrates how a depth estimation system can compute depth by determining differences in phase between an emitted reference signal and light reflected off of a target object.

FIG. 2 shows a depth estimator 200, which may include the illuminator 105 and the detector 125 from FIG. 1. Here, the depth estimator 200 is emitting reference light 205, which is an example implementation of the pulsed ray of sinusoidal light 110 from FIG. 1. The reference light 205 is directed towards an object 210, which is representative of the target object 115 from FIG. 1.

As used herein, the phrase "target object" should be interpreted broadly to include any number of different types of objects. For example, a target object can be expansive as an entire environment, such as an outdoor environment, a room in a house, an entire room or area or building, or any other surrounding, area, or enclosure in which the MR system's depth estimator 200 is operating. In situations where a target object includes an entire environment (e.g., such as a room), the environment may include any number of smaller discrete objects (e.g., tables, desks, chairs, furniture, people, animals, etc.). Alternatively, a target object can refer simply to only a single object or feature (e.g., a wall). Accordingly, the phrase "target object" should be interpreted broadly to include any number of different things, as described above.

Object 210 is shown as including an object point 210A. Similar to how a "target object" should be interpreted broadly, an "object point" should also be interpreted broadly. As an example, suppose the object 210 is a room in a house. Here, object point 210A can be a piece of furniture within that room, a part of a wall, an animal, a part of an animal, or any other discrete object in the room. Object point 210A can also be a wall or boundary within the room. In situations where object 210 is a discrete object, object point 210A can be a specific point or location on the object 210. For instance, suppose object 210 is a ball. Object point 210A can, therefore, be a specific part of the ball. As such, the phrase "object point" should also be interpreted broadly.

Such broad interpretations are used because the reference light 205 may be emitted three-dimensionally. As such, a three-dimensional wave may strike object 210, and reflected light 215 may be produced. Here, reflected light 215 may be the light that reflected off of a particular point (e.g., object point 210A) of the object 210. The depth estimator 200 can then capture any number of reflected light waves so as to determine the contour, shape, and/or geometries of the object 210, including any specific points on the object 210.

FIG. 2 shows how the reference light 205 includes a sinusoidal period 220. As used herein, period 220 refers to the distance between any two consecutive corresponding points on the sine wave having equal amplitudes (e.g., consecutive maximum points or consecutive minimum points or any other consecutive points along the curve having equal amplitudes). Here, the period of the reference light 205 will be the same as the period of the reflected light 215, though the periods may have a shift or difference as a result of the light striking the object 210. To illustrate, the overlapping sinusoidal periods 225 shows how the period of the reference light 205 is substantially the same as the period of the reflected light 215, but there is a phase shift between the two sinusoids. Such a phase shift is shown by phase shift/delay 230. As used herein, phase shift/delay 230 represents how far the sinusoid of the reflected light 215 was displaced horizontally (as a result of reflecting off of an object) as compared to the sinusoid of the reference light 205.

To clarify, this phase shift/delay 230 occurs as a result of the reference light 205 striking the object 210 (and in particular a point on the object 210, such as object point 210A) at different locations along its sinusoidal curve.

Figure 3A:
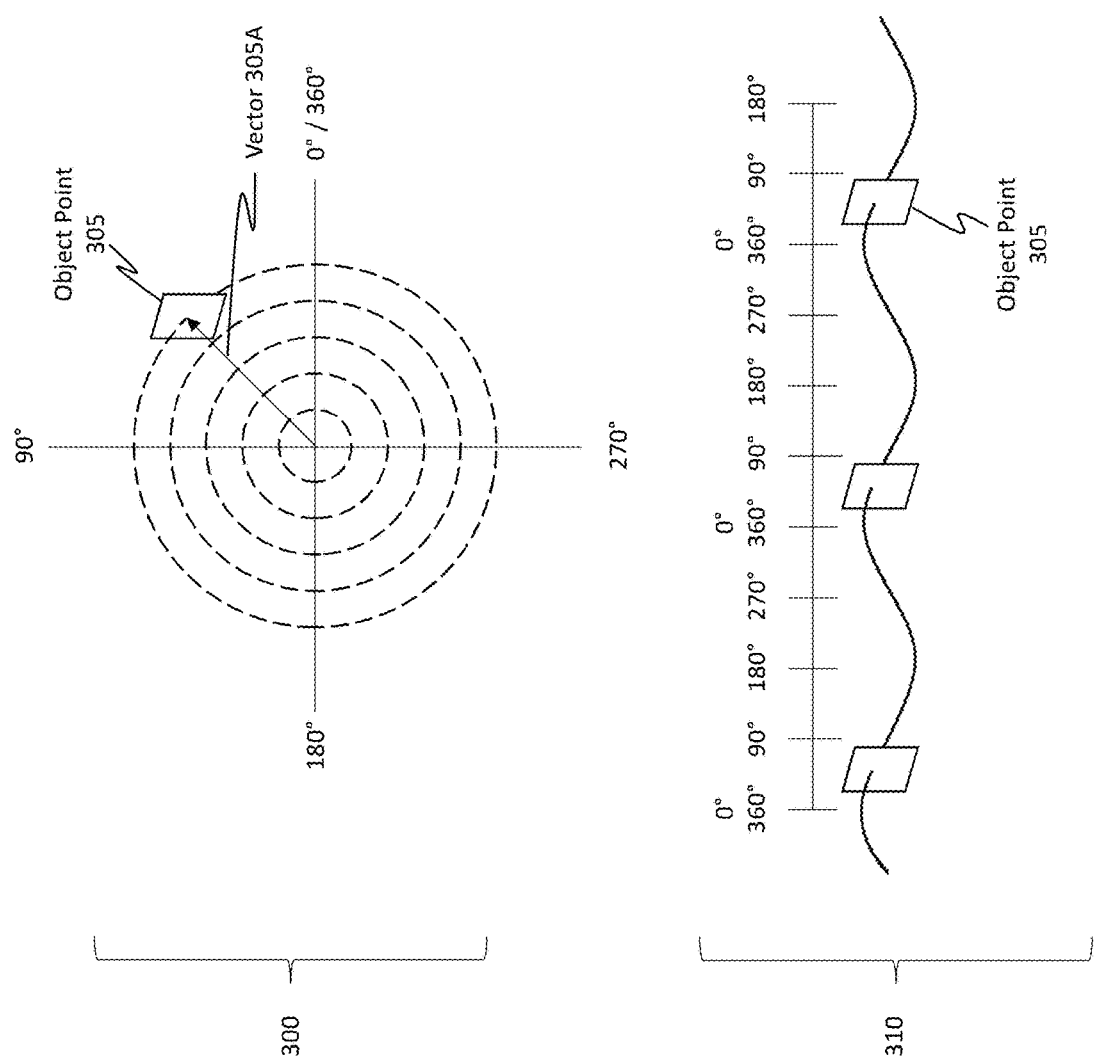
FIG. 3A illustrates how a period of a sinusoidal wave wraps every 360° (or a radians). Due to the wrapping nature of a sine wave, ambiguities may exist within a phase image.

FIG. 3A illustrates an example unit circle 300 divided into different angular values (e., 0° to 360°) in a counterclockwise manner. Unit circle 300 shows an object point 305 with a vector 305A directed towards the object point 305. Here, object point 305 is representative of object point 210A from FIG. 2.

Vector 305A defines both an angle and magnitude at which the object point 305 is located relative to the unit circle 300. It should be noted that unit circle 300 maps out the phase shift/delay 230 from FIG. 2. For instance, with reference to FIG. 2, the reference light 205 strikes the object 210 and produces a phase shift/delay 230 of approximately 45° according to the visualization provided by unit circle 300. Of course, these are just example values and should not be viewed literally or in a limiting manner. By way of further clarification, the resulting phase shift/delay 230 between the reference light 205 and the reflected light 215 is approximately 45° according to vector 305A plotted on unit circle 300. The magnitude of vector 305A is related to the relative intensity or brightness of the reflected light 215, as measured by the depth estimator 200. That intensity or brightness magnitude may be included within an active brightness image, which will be discussed later.

Because ToF estimators rely on phase shifts to identify depth, some ambiguities may occur. For instance, plot 310 in FIG. 3A illustrates an example of such ambiguities. Here, object point 305 is illustrated on the plot 310. Plot 310 maps out a sinusoidal wave along a horizontal axis with reference degree values (e.g., 0°, 90°, etc.) corresponding to the points along the unit circle 300 and repeating for each repeating period of the sinusoid. It should be noted that one traversal around the unit circle 300 is representative of one period of the sinusoid.

Figure 3B:
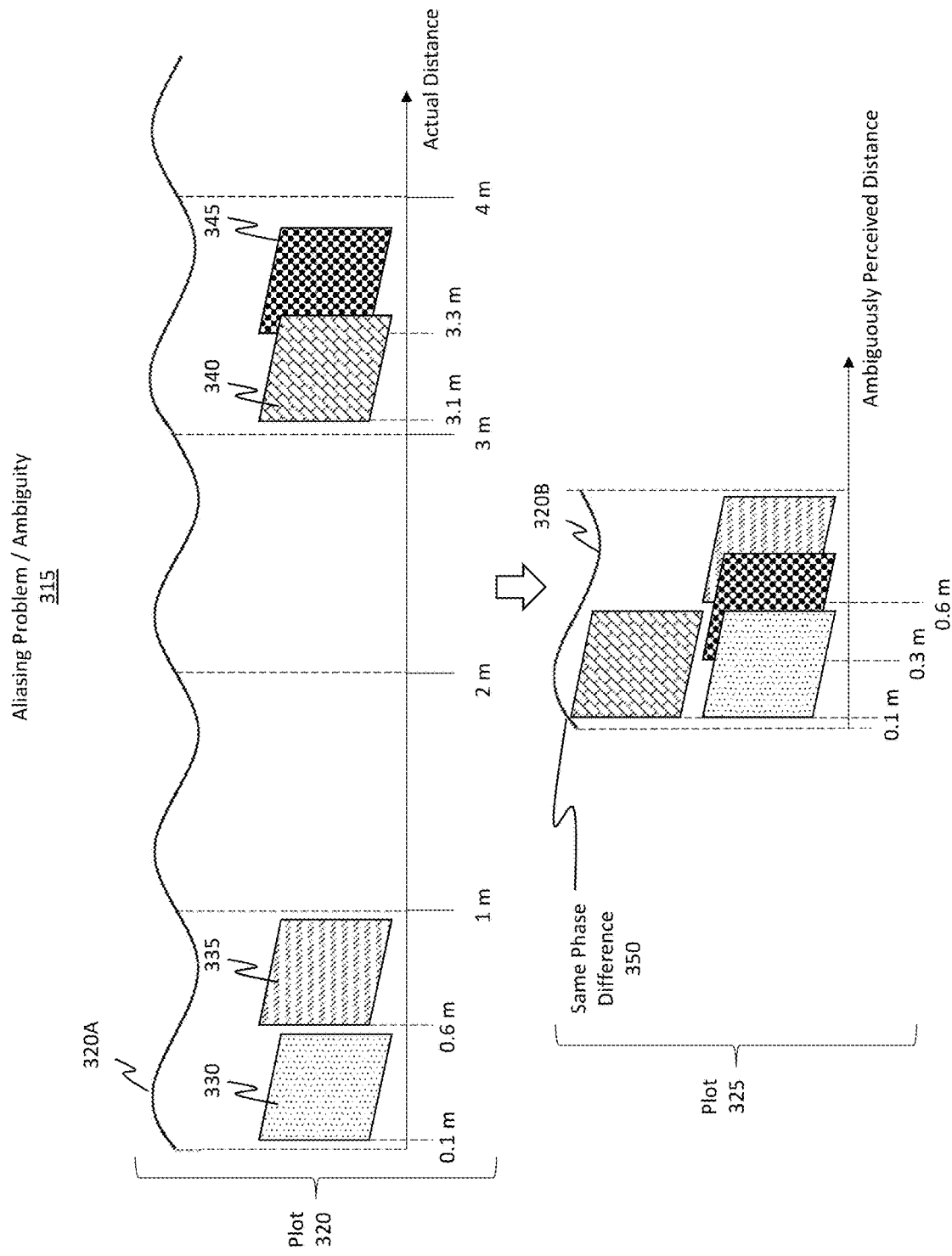
FIG. 3B illustrates how some ambiguities may occur within an infrared phase image due to the wrapping nature of a sine wave.

As described earlier, the phase shift/delay corresponding to object point 305 is about 45°. Because phase measurements are used, however, it may be unclear as to what the actual distance of object point 305 is because of the wrapping, repeating, or cycling attributes of a sinusoid. To clarify, as shown in FIG. 3A, uncertainties or ambiguities arise because object point 305 may be viewed as being at any 45° point along a repeating scale. FIG. 3B provides additional clarity regarding these depth ambiguities.

Specifically, FIG. 3B shows an aliasing problem/ambiguity 315. Here, there are two separate plots, plot 320 and plot 325. Plot 320 shows an object 330, an object 335, an object 340, and an object 345 placed at various real-world actual distances relative to a depth estimator (not shown). For instance, object 330 is about 0.1 meters (m) away from the depth estimator, object 335 is about 0.6 m away, object 340 is about 3.1 m away, and object 345 is about 3.3 m away. In this regard, objects 340 and 345 are about 3 meters further removed from the depth estimator than objects 330 and 335.

Plot 320 also shows a sinusoid 320A having a period of about 1 meter in length. Here, the sinusoid 320A cycles, wraps, or repeats about four times. Furthermore, objects 330 and 335 are positioned within the first period of the sinusoid 320A (e.g., within the first wrapping interval of sinusoid 320A) while objects 340 and 345 are positioned within the fourth period of the sinusoid 320A (e.g., within the fourth wrapping interval of sinusoid 320A).

Because phase is used by ToF systems, these systems can accurately determine depth within a particular period of the sine wave (e.g., using the phase shift/delay values), but these systems often have difficulty distinguishing between objects located in different wrapping intervals. For instance, because phase is used, the depth estimation system ambiguously perceives distance in accordance with plot 325. Herein, plot 325 shows a single period of a sinusoid 320B, which is representative of a single period of the sinusoid 320A and which is mapped along an ambiguously perceived distance scale. That is, the horizontal scale of plot 325 is only 1 meter in length and corresponds to the period of the sinusoid 320B.

As shown, object 330 is at the 0.1 m position and object 335 is at the 0.6 m position. Now, however, because the system has difficulty distinguishing between wrapping intervals (i.e. the number of times the sinusoid's period repeats), object 340 is also shown at the 0.1 m position and object 345 is shown at the 0.3 m position. This occurs because of the periodic wrapping nature of a sinusoid. For instance, object 330 and object 340, even though they are separated by 3 m, they actually share the same phase difference 350 (e.g., both are 0.1 m from the original of the sinusoid's period, or rather both are positioned at the same location on the unit circle 300 shown in FIG. 3A). Accordingly, use of phase values to determine depth often results in ambiguous data or ambiguous depth understanding.

De-Aliasing Phase Data

In order to "decrypt," or "de-alias," the phase depth data, some ToF systems emit sinusoids having different periods and then use lookup tables to determine actual depth. For instance, the ToF system can compare and contrast the lookup tables for the different periods based on the resulting phase shifts so as to accurately determine the actual depth between the depth estimator and the target object.

For example, in many cases, three separate sinusoids are emitted to generate a full 3D depth image with a phase-based ToF depth sensor. For each sinusoid, three IR images are typically captured, resulting in nine IR images being used.

The first step in extracting or generating a depth map is to measure the phase delay or shift at a single frequency from the depth camera. This is performed by capturing three separate IR images, which are then used to estimate the phase shift between the target object and the sensor (i.e. the sensor/estimator of the ToF depth estimation system).

The fact that the measurement is based on period, which wraps around every a or 360°, means that the distance/depth will have an aliasing distance (i.e. the depth ambiguity described in connection with FIGS. 3A and 3B). Estimating the phase shift/delay at multiple frequencies and using a de-aliasing algorithm, these ambiguities can be resolved, thereby, improving camera performance. This technique of measuring phase shift is then repeated two additional times at different periods/frequencies to provide a true depth estimation without the aliasing ambiguities. Each of the nine IR images (1) requires illuminators to illuminate the scene, environment, or target object, (2) requires a camera exposure, and (3) requires an image to be read out from the camera sensor.

Accordingly, when computing depth using IR light, many ToF depth cameras actually capture multiple "phase images" (e.g., typically around nine). Multiple phase images are captured because depth cameras pulse their IR illumination sources (e.g., a laser or illuminator, such as illuminator 105 from FIG. 1) at three different IR light modulation periods or frequencies. For each of these three separate modulations, a depth camera then captures three separate phase images, resulting in nine total phase images. The phase images are then combined using a raw-to-depth algorithm to obtain a single IR depth map.

Figure 4:
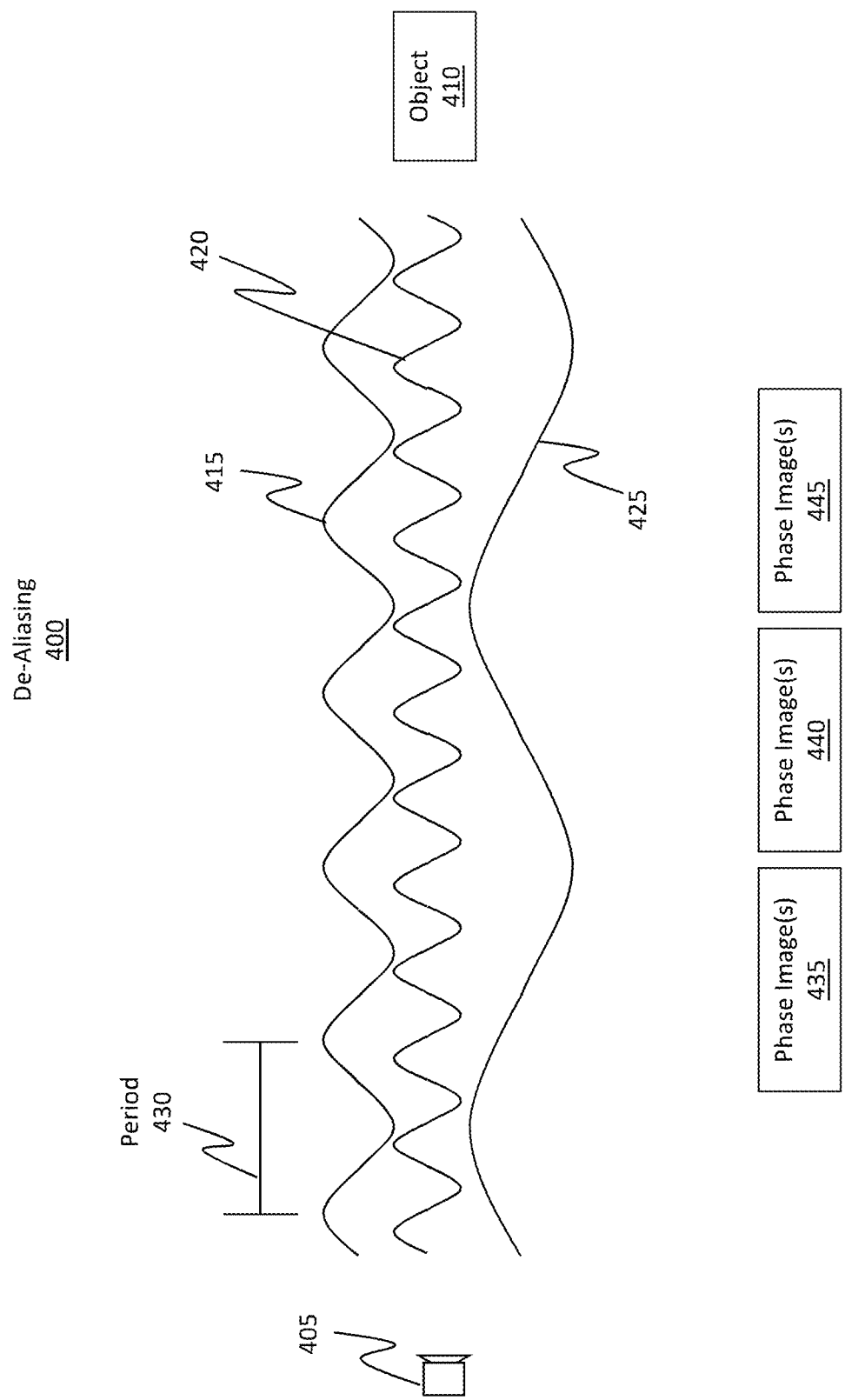
FIG. 4 illustrates one example technique for de-aliasing or resolving the ambiguities included within infrared phase images. These techniques may be used to generate training data that will eventually be fed into a machine learning component.

FIG. 4 shows an example technique for de-aliasing 400 ambiguities in phase images in the manner just described. As will be described later, these techniques can be used to generate a large corpus of training data that may be used to train a machine learning component in a supervised manner so as to eventually reduce the number of phase images used.

Specifically, FIG. 4 shows a depth camera 405 capturing IR phase images of an object 410. In this scenario, there are three separate IR modulation phase/frequency illumination measurements (e.g., IR light 415, IR light 420, and IR light 425, each of which may be representative of the pulsed ray of sinusoidal light 110 from FIG. 1 or the reference light 205 from FIG. 2) being projected towards the object 410 by an IR light illumination source (not shown). As shown by the different wave patterns, each of these different IR light waves has a different modulation frequency and period (e.g., period 430). Two of them have higher modulation frequencies (e.g., typically around 150-200 MHz) and shorter periods while the third has a lower modulation frequency (e.g., typically around 5-20 MHz) and a longer period. By capturing three phase images (e.g., phase image(s) 435 for IR light 415, phase image(s) 440 for IR light 420, and phase image(s) 445 for IR light 425) for each of the three separate modulations (resulting in nine total images), depth camera 405 will be able to accurately determine the distance between itself and the object 410.

The reason why many IR depth cameras use three different IR modulation frequencies is to resolve what is referred to as the depth aliasing ambiguities described in connection with FIGS. 3A and 3B. To be more precise, depth aliasing ambiguities occur as a result of the IR depth camera not being able to accurately determine how many "period wraps" are between itself and the target object when only a single IR light modulation is used to illuminate the target object. Each new repeating period (e.g., period 430) of the sinusoid represents a "phase wrap" or a "phase interval" in FIG. 4.

If only a single IR modulation period were used, depth camera 405 may not be able to accurately determine whether object 410 was one period wrap away, two period wraps away, three period wraps away, and so on. As an example, if period 430 of IR light 415 is 1 meter (m) (and hence period wraps every 1 m), depth camera 405 would not be able to distinguish the difference between the cyclic depths of 500 mm, 1500 mm, 2500 mm, and so on, thus resulting in a depth aliasing ambiguity when only the one type of sinusoid (or the one type of period) is used to illuminate object 410.

By projecting an increased number (e.g., 3) separate IR modulations (each having different periods) towards object 410, any depth aliasing ambiguities can be resolved because depth camera 405 can determine and then compare the number of period wraps for each of the three separate IR modulations.

To illustrate, object 410 is approximately 6 period wraps away with reference to IR light 415, it is approximately 12 period wraps away with reference to IR light 420, and it is approximately 2 period wraps away with reference to IR light 425. Combinations of lower and higher modulation periods improve how the aliasing issue is resolved. For instance, higher modulation frequency emissions (e.g., shorter periods) help improve depth accuracy while longer periods help accurately determine the number of period wraps. Accordingly, FIG. 4 represents one example technique for de-aliasing phase ambiguities included within phase images. The remaining sections will focus on improved techniques for de-aliasing phase ambiguities. These improved techniques use fewer emissions and fewer phase images, thus the MR system's battery life is prolonged and there are fewer data transfers and related computations. The concepts disclosed in connection with FIG. 4 are still beneficial, however, because these techniques can be used to generate a corpus of training data used to train a machine learning component, as will be discussed in further detail later.

Improved Techniques to De-Alias Phase Ambiguities

Figure 5:
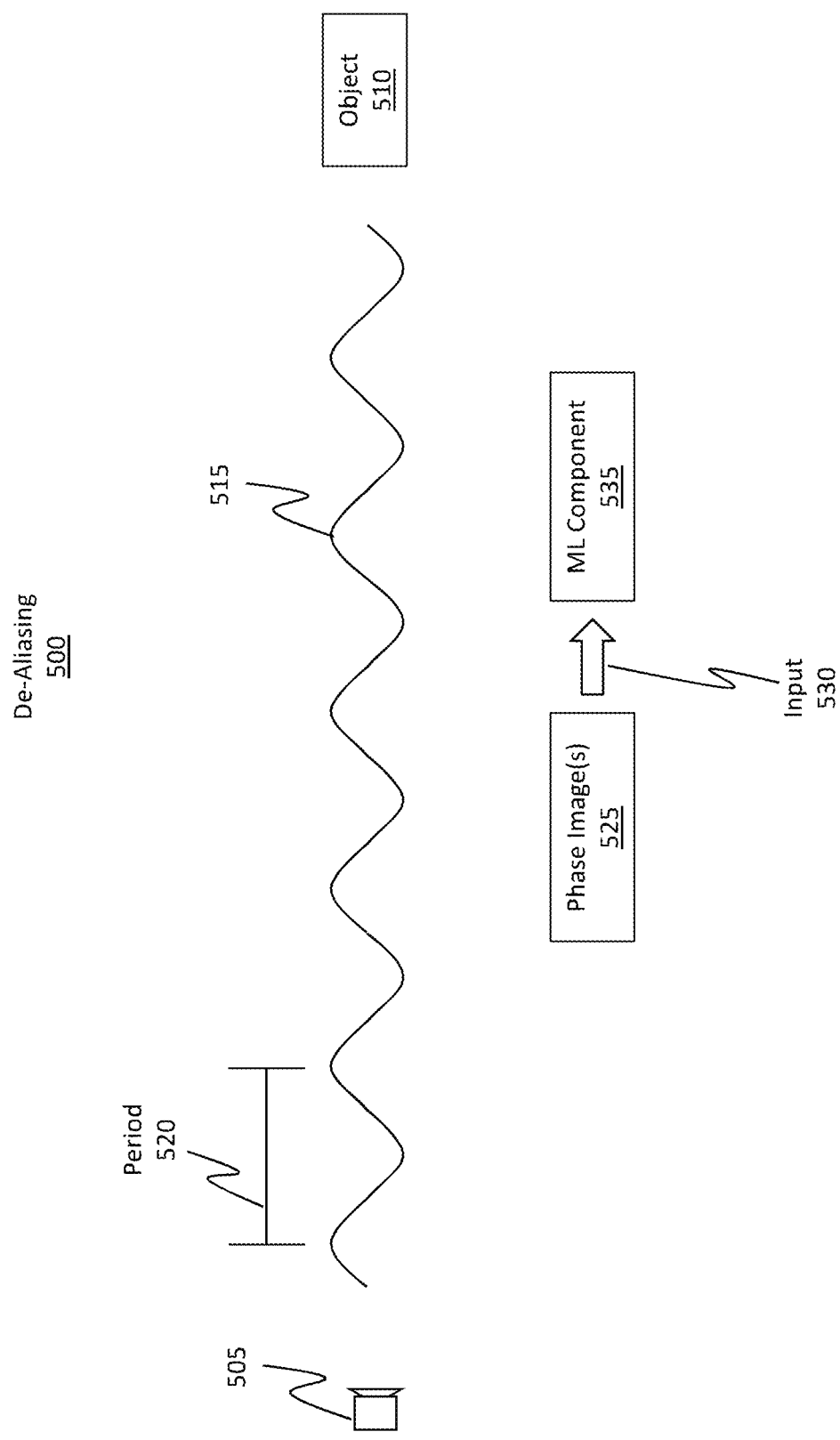
FIG. 5 illustrates an improved example technique for de-aliasing or resolving ambiguities included within infrared phase images.

FIG. 5 illustrates an improved technique for de-aliasing 500 phase ambiguities embedded or included within depth phase images. Similar to FIG. 4, FIG. 5 shows a depth camera 505 (e.g., the depth estimator 200 from FIG. 2), an object 510 (e.g., a type of target object), and a sinusoid 515 having a period 520. Also similar to FIG. 4, FIG. 5 shows how depth camera 505 can take a certain number of phase image(s) 525 of the sinusoid 515 (e.g., 1, 2, or 3 phase images).

One major difference between FIG. 4 and FIG. 5, however, is in the number of sinusoids and the number of phase image(s) that are used. For instance, in FIG. 5, only sinusoid 515 is provided and potentially only one, two, or three phase image(s) 525 are used. In accordance with the disclosed principles, the embodiments are now able to feed the reduced number of phase image(s) 525 as input 530 into a machine learning ("ML") component 535. ML component 535 is specially configured or trained to assist with de-aliasing the phase ambiguities discussed earlier.

It will be appreciated that the embodiments are not limited to using one particular period length for a sinusoid. For instance, the period (e.g., period 520) can be set to any value and is not limited to a single particular length. Additionally, while FIG. 5 shows only a single sinusoid 515, it will be appreciated that the embodiments are operable with any number of sinusoids.

For instance, some embodiments may selectively emit multiple sinusoids having different periods, such as is shown in FIG. 4. To clarify, in some cases the reference light may include two or more pulsed rays of sinusoidal illumination light, where each ray has a particular period (e.g., a different period or potentially the same period when multiple camera images for the same period are desired). In this case, a separate phase image may be generated for each one of the two or more pulsed rays. In some cases, the periods for the different rays may be common or they may be different. In some cases, the pulsed rays of sinusoidal light include three pulsed rays such that at least three separate phase images are generated. In situations where multiple pulsed rays have a common sinusoidal period, a phase image may be captured for each ray, and these phase images can be combined to generate an aggregate phase image that may more accurately reflect the environment as compared to a single-phase image.

Alternatively, the embodiments can select the phase image having a desired threshold quality level. Additionally, the embodiments can analyze each of the three images to identify which specific image is highest in quality relative to the other images. This high-quality image can then be used as the specimen fed into the ML component 535.

In some cases, determining how many phase images to capture is dependent on the type of object being monitored. For instance, near an object's edge(s), the depth determination will likely be less certain. Consequently, the embodiments can determine whether additional depth monitoring is required for contours or edges. In this regard, the quality expectation or threshold for depth monitoring can be different depending on the characteristics of the objects being monitored, such as, for example, whether an edge or contour is being recorded.

Accordingly, in contrast to generating nine separate phase images, the disclosed embodiments can reduce power consumption by refraining from recording the whole set of nine input phase images, as described in FIG. 4. In one implementation, the embodiments rely on only a single modulation frequency or period (out of the three previous ones) and record only one, two, or three phase images for that one modulation frequency/period, as shown in FIG. 5.

Example Method(s) for De-Aliasing Using Machine Learning

The following discussion now refers to a number of method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
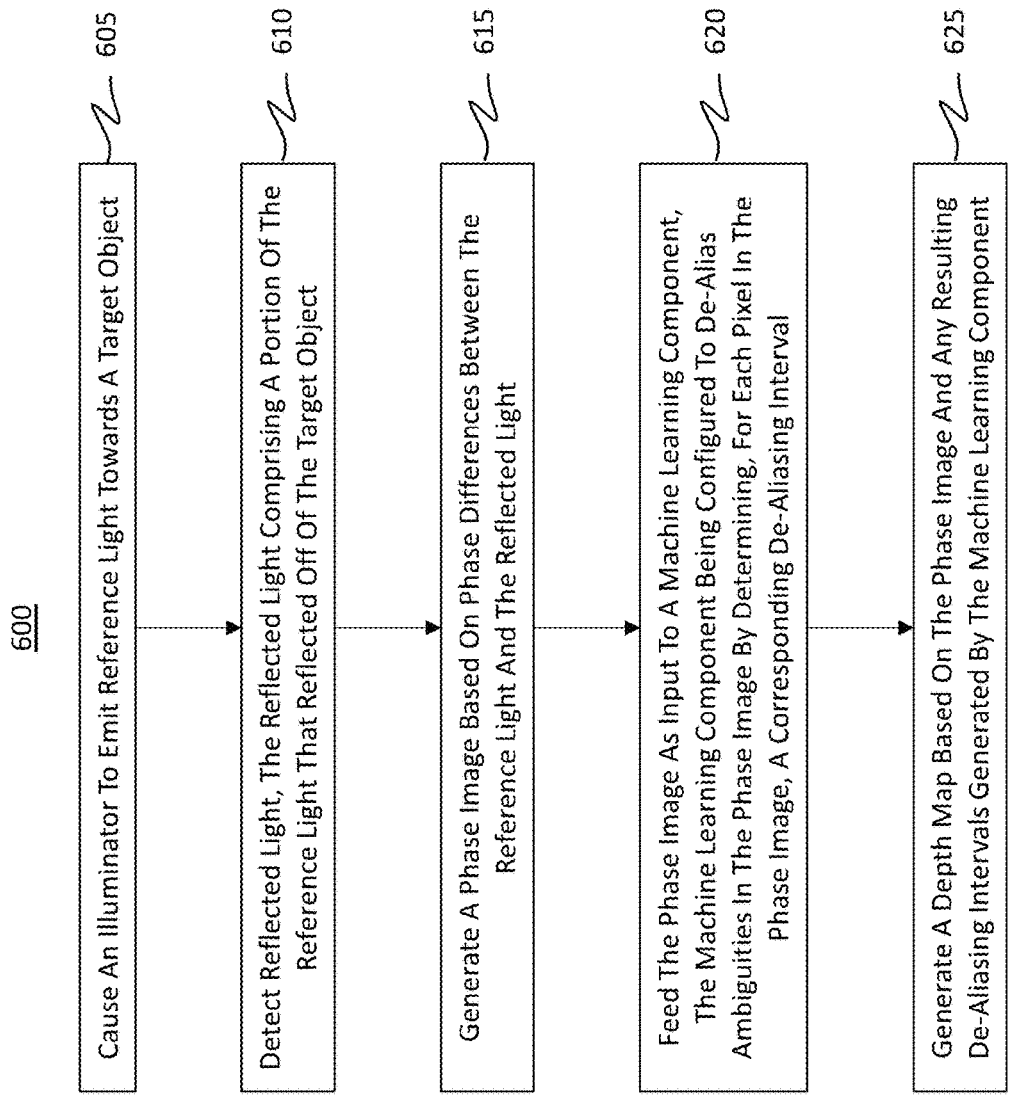
FIG. 6 illustrates a flowchart of an example method for de-aliasing ambiguities included within infrared phase depth images.

FIG. 6 illustrates an example method 600 for de-aliasing depth ambiguities included within infrared phase depth images. Initially, method 600 includes an act 605 of causing an illuminator (e.g., any of the illuminators discussed thus far) to emit reference light towards a target object, such as was shown in connection with FIGS. 1 and 2. Here, the reference light (e.g., infrared light or even RGB light) can comprise a pulsed ray of sinusoidal illumination light having a particular period and frequency. For instance, in some embodiments, the period can be within a range spanning 0.25 meters and 1.75 meters (or even 2 meters) in length and the frequency can be within a range spanning 100 MHz and 300 MHz. In some cases, the range is between 10 MHz and 450 MHz. Of course, these are example values only and other range values may be used as well. For instance, the range of the period may be between 0.5 meters and 1.5 meters. In some embodiments, the excitation frequency is between 10 and 350 MHz, thus the longest path or period of the sinusoid can even be up to 30 m in length.

Figure 7A:
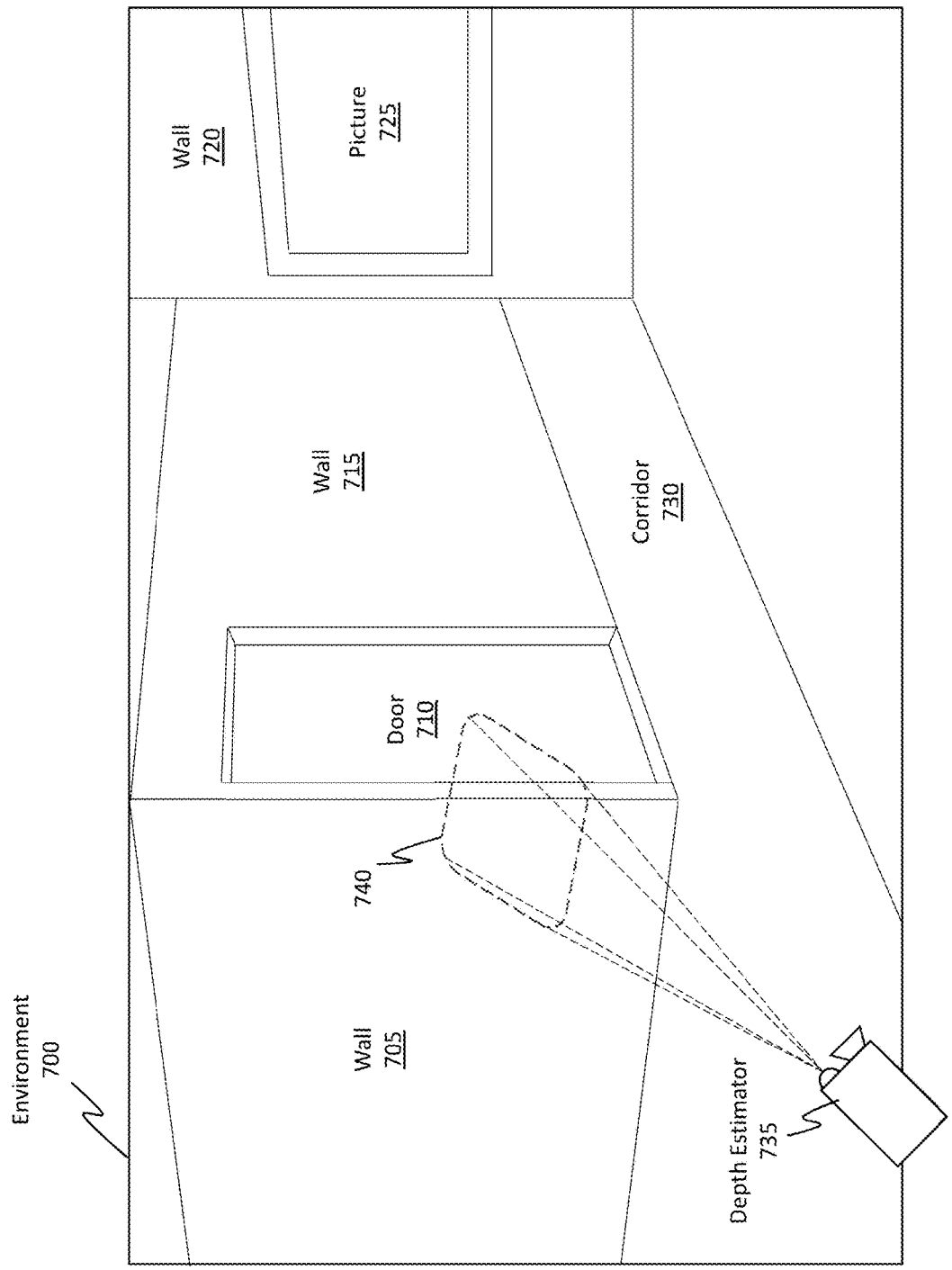
FIG. 7A illustrates an example scenario in which a depth estimator is being used to map out the depths and contours of an environment (e.g., a target object).

Turning briefly to FIG. 7A, there is shown an example environment 700, which may be representative of the target object referenced in method act 605. Environment 700 includes numerous different objects, such as wall 705, door 710, wall 715, wall 720, picture 725, and corridor 730. In FIG. 7A, a depth estimator 735, which may include the illuminator of method act 605 as well as a depth camera, is projecting or emitting reference light 740 into environment 700.

Returning to FIG. 6, method 600 also includes an act 610 of detecting reflected light, such as is shown in FIGS. 1 and 2. Here, the reflected light comprises a portion of the reference light that reflected off of the target object. For instance, reflected light 215 from FIG. 2 includes at least a portion of the reference light 205. Furthermore, as shown in FIG. 2, there is a phase shift/delay 230 between the reference light 205 and the reflected light 215. With reference to FIG. 7A, the depth estimator 735 can be used to detect the reflected light. Here, the reflected light may have reflected off of any of the objects (e.g., wall 705, door 710, etc.) included within environment 700. In some cases, the process of detecting the reflected light also includes determining ambient infrared light conditions of the environment. Such a determination may be useful in determining the active brightness illumination fall-off as a function of distance.

Next, method 600 includes an act 615 of generating a phase image based on any phase differences or phase shifts between the reference light and the reflected light. In some cases, 1, 2, or 3 phase images are generated. In some cases, the illuminator was triggered three separate times using perhaps the same type of sinusoid (i.e. sinusoids having the same period, frequency, or amplitude) while in other cases different types of sinusoids are emitted. For each emission, a corresponding phase image is generated. Thus, in some embodiments, instead of generating 9 images as discussed earlier, only 3 images are generated. In some cases, only 2 images or perhaps even only a single image is generated.

In some embodiments, three sinusoids, with each having a different period, may be emitted and only a single-phase image is generated for each sinusoid. The embodiments are able to selectively modify which sinusoids are to be emitted as well as the number of phase images that are to be captured. In some cases, three sinusoids may be emitted, but the embodiments refrain from capturing a phase image for one or more of those sinusoids or, if phase images are captured, then one or more of those phase images may not be used (i.e. the system refrains from using phase images, even though they were captured). Such a scenario may be beneficial in a situation where the quality of one of the phases images is sufficiently adequate such that no other phase images are required. That said, however, the conditions of the environment may change (e.g., an object moved), and the system may (e.g., after-the-fact) elect to start using all of the phase images so as to improve the depth determinations.

Figure 7B:
FIG. 7B shows how the depth estimator can output both an infrared phase image and an infrared active brightness image.
Figure 7B:
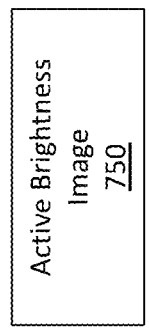
Figure 7B:
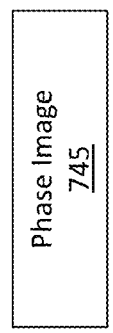

FIG. 7B shows the depth estimator output 740A of the depth estimator 735 from FIG. 7A. Here, the depth estimator output 740A includes at least a phase image 745. Optionally, the depth estimator output 740A may additionally include an active brightness image 750. As used herein, an active brightness image (e.g., active brightness image 750) can be viewed as a byproduct of ToF computations and is essentially similar to an image of a regular infrared camera and which captures different IR intensities. In some cases, depth estimator 735 may also emit red, green, or blue ("RGB") light in order to capture an RGB image 755 (i.e. a visible color spectrum image).

The phase differences described earlier represent changes in depth within overlapping sinusoidal periods of the reference light and the reflected light. For example, FIG. 2 shows how the period of the reference light 205 can overlap with the period of the reflected light 215, as shown by overlapping sinusoidal periods 225. Here, the difference in phase, or the phase shift/delay 230 represents a depth value, as shown by the unit circle 300 of FIG. 3.

Figure 8:
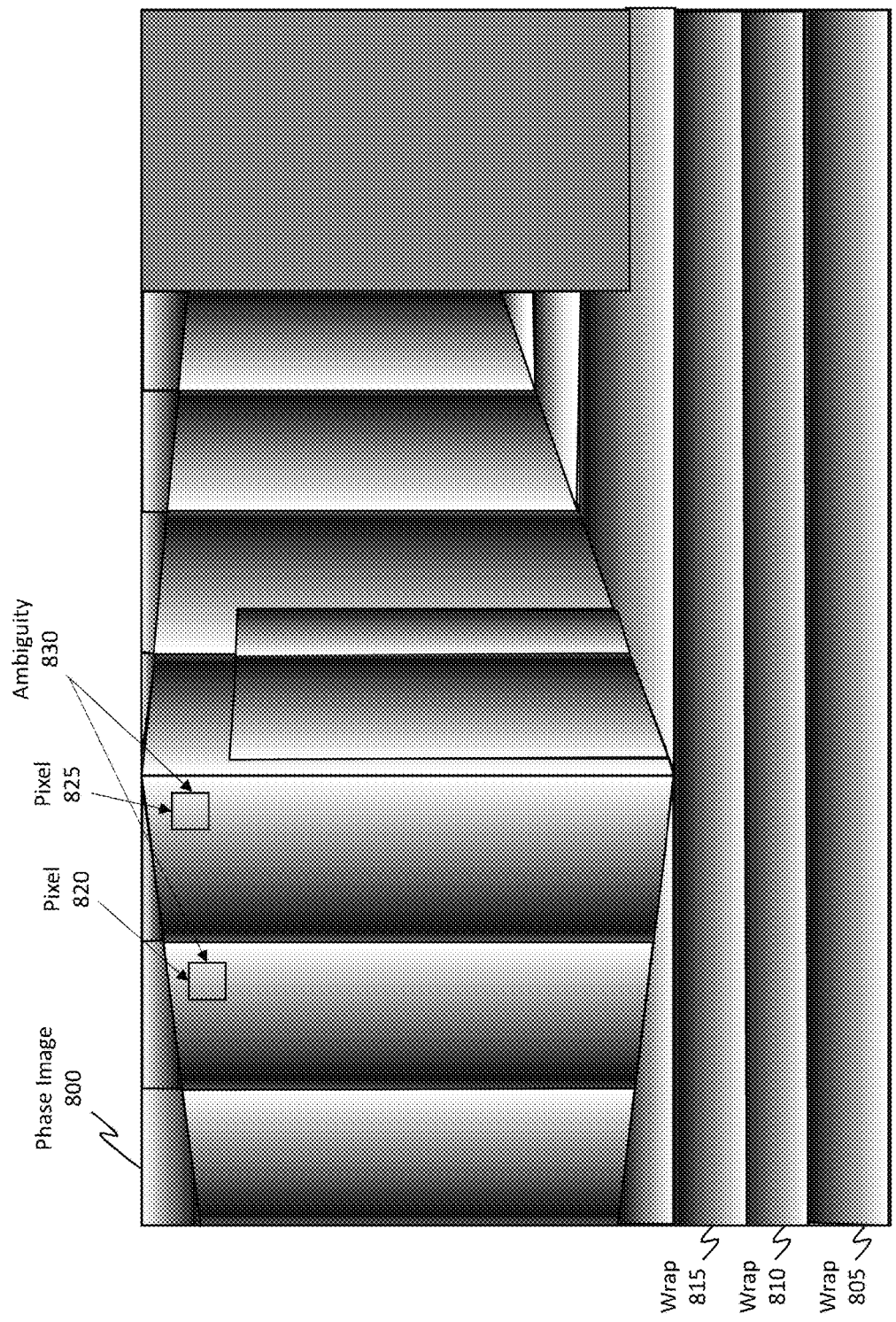
FIG. 8 illustrates an example of an infrared phase image, where the phase image may illustrate step-like characteristics due to the sine wave's period wrapping. These step-like characteristics cause depth ambiguities.

FIG. 8 provides an example illustration of a phase image 800, such as phase image 745 from FIG. 7B. Here, phase image 800 is an IR phase-based image of the environment 700 from FIG. 7A. As shown, phase image 800 includes numerous ambiguities as a result of the emitted sinusoid's period repeating every 360°. For instance, phase image 800 shows a wrap 805, wrap 810, and wrap 815 (e.g., the sinusoid may wrap every 1 meter or so, depending on its period, thus each step-like transition is approximately 1 meter).

To clarify, the color gradient included within each wrap demonstrates/illustrates a distance of the environment relative to the emitted sinusoid. Furthermore, as shown, some of the colors within each color gradient are the same between wrap 805, wrap 810, and wrap 815. As a specific example, consider pixel 820 and pixel 825, both of which correspond to specific points on the wall 705 of environment 700. As shown, there is an ambiguity 830 between pixel 820 and pixel 825 because the two pixels share the same phase shift/difference value (i.e. the same color in FIG. 8), even though the corresponding actual location of the objects for those pixels are at different locations or depths along wall 705. Accordingly, FIG. 8 shows how the resulting phase image 800 can include step-like ambiguities resulting from the periodic nature of a sinusoid.

In this regard, the phase image includes certain ambiguities. These ambiguities occur as a result of multiple different depths represented by the phase image sharing a same phase difference value even though those multiple different depths correspond to different real-world depths. By way of additional clarification, FIG. 3B shows how object 330 and object 340 have different real-world actual depth distances (e.g., 0.1 m and 3.1 m, respectively) but how they also have the same phase difference 350. This similar or same phase difference 350 occurs as a result of those two objects lying at the same angular location on the unit circle 300 of FIG. 3A. That is, even though the detected brightness or intensity (e.g., the magnitude of vector 305A) of the two objects may be different, their phase angles are the same because both are positioned 0.1 meters from the original (or 0° value) of the sinusoid. As such, the resulting phase image is ambiguous.

Returning to FIG. 6, in order to resolve any such ambiguity, method 600 includes an act 620 of feeding the phase image as input to a machine learning ("ML") component, as shown in FIG. 5. Here, the ML component is specially configured or trained to de-alias the ambiguities in the phase image. Such de-aliasing is performed by determining, for each pixel in the phase image, a corresponding "de-aliasing interval." As used herein, a "de-aliasing interval" represents the number of times the sinusoid's period wrapped, repeated, or cycled prior to reaching the target object (e.g., the number of traversals around the unit circle 300 of FIG. 3A).

To clarify, each pixel's corresponding de-aliasing interval represents a number of times the reference light sinusoidally wrapped in period between the illuminator and a corresponding point (e.g., object point 210A from FIG. 2) on the target object (e.g., object 21) corresponding to each pixel. That is, the pixel corresponds to the point on the target object. A collection of multiple pixels can describe the object as a whole. With reference to the unit circle 300 of FIG. 3A, each de-aliasing interval constitutes one traversal around the unit circle 300, where the traversal is dependent on the length of the sinusoid's period. Accordingly, an interval classification may be provided or assigned to each pixel in the phase image by the ML component so as to effectively map out the distance each pixel is relative to a depth estimator.

Here, it is likely that multiple de-aliasing intervals will be generated by the ML component because the reference light will likely wrap more than one time prior to striking any point on the target object. For instance, with reference to FIG. 3B, the sinusoid 320A wrapped three times prior to striking objects 340 and 345, meaning that objects 340 and 345 were included within the fourth interval of the sinusoid 320A.

Figure 9:
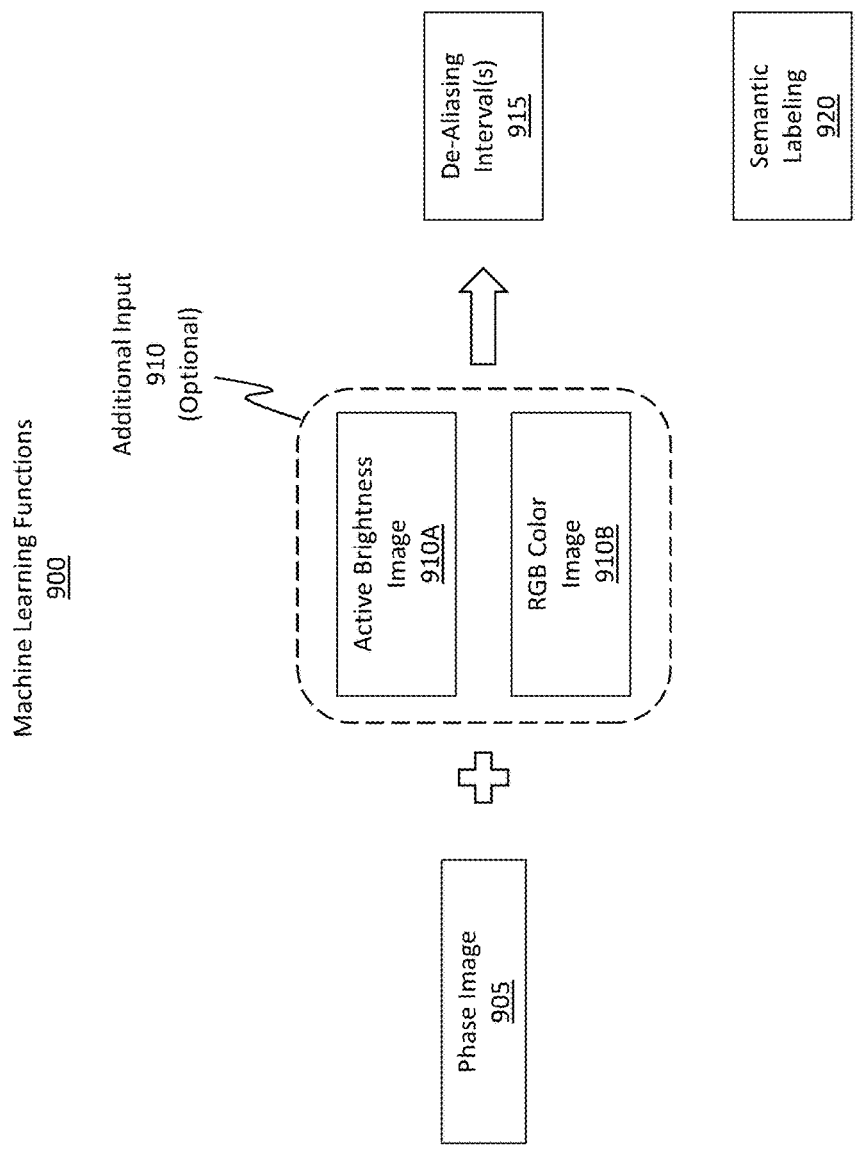
FIG. 9 illustrates how a machine learning ("ML") component can receive a phase image as input (as well as an active brightness image and/or a red, green, blue RGB color image), perform machine learning on the input, and produce any number of de-aliasing intervals and even semantic labeling. Here, the de-aliasing intervals represent a number of times the reference light's sinusoidal period cycled, wrapped, or otherwise repeated prior to striking a point on a target object.

FIG. 9 further elaborates on the above concept. In particular, FIG. 9 shows a number of machine learning functions 900 performed by the ML component 535 of FIG. 5. As described above, a phase image 905, which is representative of phase image 800 from FIG. 8 and the phase image mentioned in method 600, is fed as input into the ML component. As an optional variant, some additional input 910 may also be fed into the ML component. In some cases, the additional input 910 includes one or a combination of an active brightness image 910A, which is representative of active brightness image 750 from FIG. 7B, or an RGB color image 910B, which is representative of RGB image 755 from FIG. 7B. That is, a first additional input to the ML component may be the active brightness image 910A that is generated in conjunction with the phase image 905. In this regard, the active brightness image 910 may also be generated using the reference light and the reflected light mentioned earlier. Additionally, a second additional input to the ML component may be the RGB color image 910B, which may also be generated in conjunction with the phase image 905 but which is generated using RGB light.

Based on its training, which will be discussed later, the ML component is able to output any number of de-aliasing interval(s) 915. As described earlier, each pixel's corresponding de-aliasing interval represents a number of times the reference light sinusoidally wrapped in period between the illuminator and a corresponding point on the target object corresponding to each pixel. Additionally, in some cases (as will be discussed later), the machine learning component also generates a corresponding confidence value for each pixel's corresponding de-aliasing interval. As will also be discussed later, in some cases, the ML component also generates semantic labeling 920.

The ML component may be any type of ML engine or component. For instance, the ML component (e.g., ML component 535 from FIG. 5) may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system.

Figure 10:
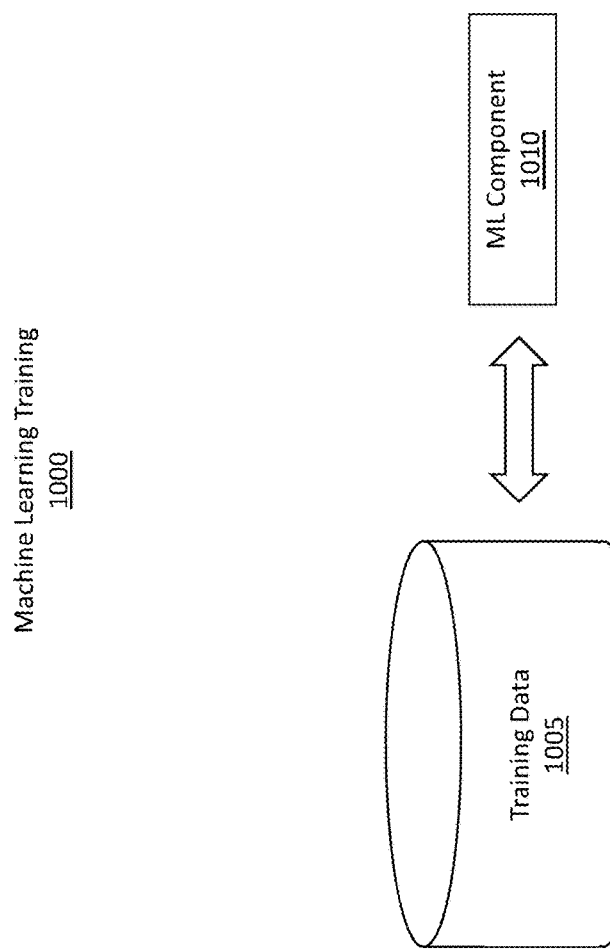
FIG. 10 illustrates how the ML component can be trained using a corpus of training data.

FIG. 10 illustrates how the ML component can be trained to identify de-aliasing intervals, as shown by machine learning training 1000. Here, there is a corpus of training data 1005 used to train the ML component 1010, which is representative of any of the previously-described ML components.

Regarding the deep learning-based algorithm or process used by ML component 1010, it deals with a per-pixel classification task where class labels correspond to de-aliasing intervals. An encoder/decoder network (or any of the other types of ML techniques described earlier) can be used to solve this per-pixel classification task. An alternative to using deep networks is the use of random decision forests to solve per-pixel classification tasks.

To train the network, the embodiments use a large amount of ground truth data, such as training data 1005. To compile training data 1005, it is possible to record three phase images using different modulation frequencies/periods using the robust technique described in connection with FIG. 4. Then, a conventional ToF de-aliasing algorithm can be used to generate de-aliasing interval images. The network is then trained using one of the three phase images and the derived "ground truth" de-aliasing interval image via supervised learning.

The above techniques are generally focused on a data-driven learning approach that implicitly learns rules/constraints from the training data. These constraints are typically expressed in terms of a cost function that is then subject to minimization. As described above, it is desirable to generate an output de-aliasing interval image. It is beneficial for such an image to fulfill one or more of the following constraints/criteria.

One criteria or constraint focuses on ensuring that spatially neighboring pixels have the same de-aliasing interval almost everywhere in the resulting de-aliasing interval image. This criterion ensures that the resulting de-aliasing image is smooth and pixel labels are not noisy.

Another criterion for the resulting de-aliasing image is that the de-aliasing image has a small number of depth discontinuities. That is, a relatively lower number of depth discontinuities is preferred over an image having a relatively higher number of depth discontinuities.

Returning to FIG. 9, the machine learning functions 900 can also generate semantic labeling 920. In other words, the ML component can additionally semantically identify any number of target objects. In some cases, already-generated semantic labeling can be fed as input or as a filtering criterion into the ML component, as will be described later.

In this regard, some embodiments produce two output images, namely: (1) a de-aliasing interval image and (2) an image of semantic labels. In some cases, these two images can be combined to form a single image. Alternatively, a single image is originally generated to include the information embedded or included within the de-aliasing interval image and the image of semantic labels. Examples of semantic labeling include classifying each pixel in an image as a real-world object, such as a human, a floor, a ceiling, a wall, and so on. The labels in FIG. 7A (e.g., wall 705, door 710, etc.) can be viewed as semantic labels.

Semantically labeling objects allows the embodiments to implement additional constraints in addition to the constraints mentioned above. For instance, it is possible to focus on output images that fulfill one or more of the following constraints.

One constraint requires that spatially neighboring pixels have the same semantic label almost everywhere in the image. This criterion ensures that the semantic labeling is smooth.

If there is a discontinuity in the de-aliasing interval image and a corresponding discontinuity in the semantic labeling, then another criterion requires that these discontinuities should be aligned. In other words, edges in the images should match up. This criterion ensures that the edges are aligned in the de-aliasing image with the outlines of objects, people, and so on. In some cases, the embodiments still allow for cases where a discontinuity in one image does not have a matching discontinuity in the other image (e.g., slanted surfaces, two objects in the same de-aliasing interval, and so on).

Another criterion involves the de-aliasing labels within a region of the same semantic label being set such that there is no discontinuity in depth. This ensures that there is no depth discontinuity within an object and the object appears to be smooth.

In the resulting depth map/surface mesh, according to yet another criterion for the ML component, objects should have a reasonable three-dimensional ("3D") extent based on their semantic classes. This means that the de-aliasing results should be reasonable based on real-world knowledge. For example, a man should typically not be characterized as being 4 meters tall or 0.5 meters small. Rather, a man should be around 2 meters tall. It is possible to further extend this list of criteria with more constraints. As such, this list is simply an example of some of the criteria that may be provided to the ML component and thus this list should not be considered as binding or exhaustive.

The ML component may also be provided with filtering criteria. Here, the ML component, after filtering the phase image based on the filtering criteria, can determine de-aliasing intervals for any objects that were not filtered. For instance, one filtering criteria can be a human-based criteria in which the de-aliasing intervals are based on the known characteristics of a human. The criteria discussed above can be examples of these so-called filtering criteria.

Using the filtering criteria, the ML component is able to determine properties about an object or surface and can predict or estimate the relative intensity of reflected light that may bounce off of the object or surface. As such, the embodiments can perform object semantics or classifications at different times in order to filter out irrelevant data. Additionally, the ML component can derive the semantic labeling itself, or it can obtain the semantic labeling from a separate ML component. In some cases, it is possible to start with a ML component that is initially trained for semantic segmentation, and then the ML component can be tuned or further refined based on period wrapping intervals.

In some embodiments, instead of, or in addition to, having the ML component generate a de-aliasing interval image or de-aliasing interval data, the ML component can generate a relevant-only data image (or conversely an irrelevant-only data image). For instance, if the depth estimation system is interested (based on certain filtering criteria) in tracking only a particular type of object, then the ML component can selectively omit data from its result so as to focus only on the relevant object. Additionally, in scenarios where objects are very far away, the ML component can selectively filter out those far-away objects based on certain depth thresholds.

Figure 11:
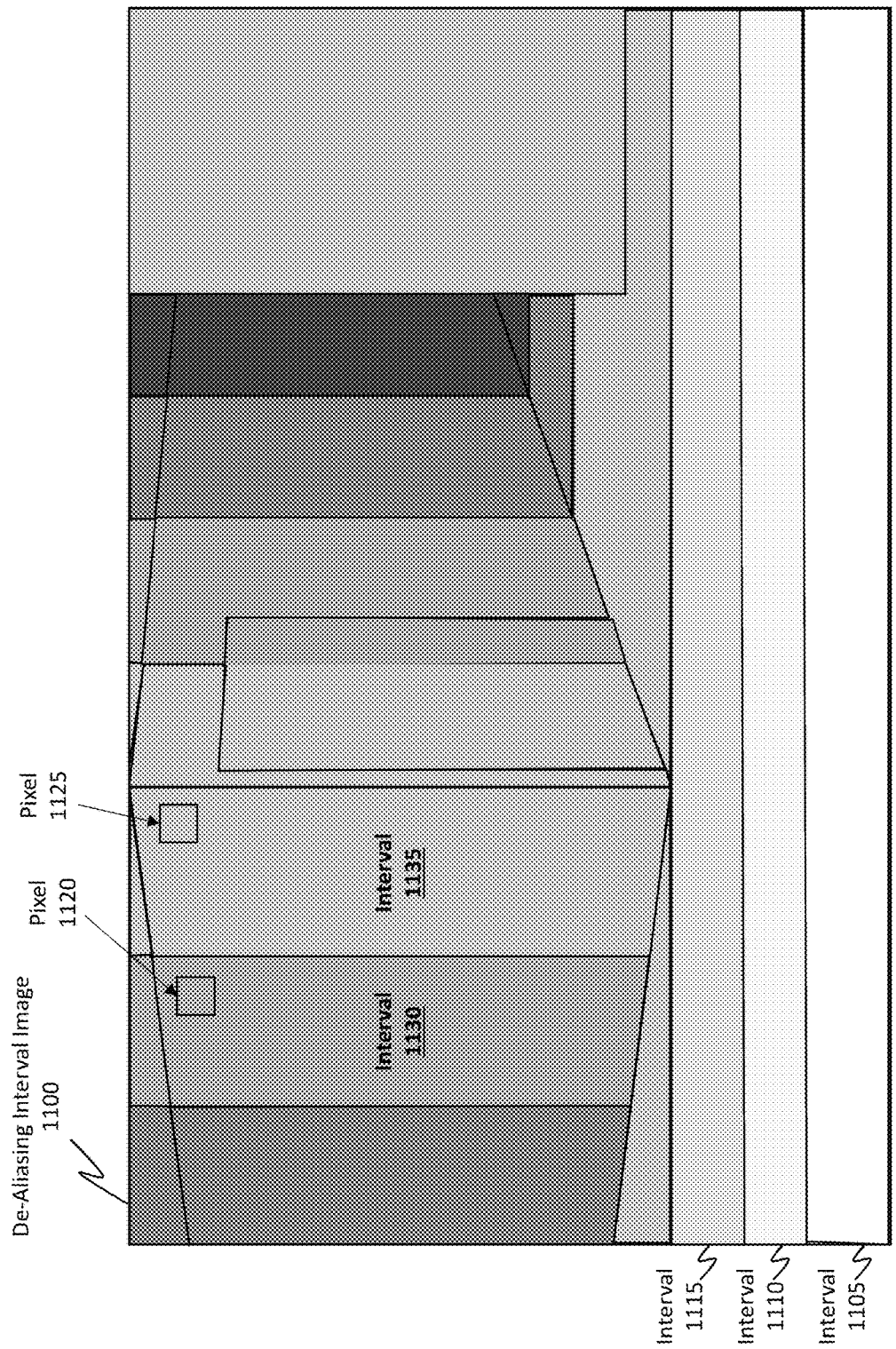
FIG. 11 illustrates an example of a resulting de-aliasing interval image generated by the ML component, where this image illustrates the number of times the reference light's sinusoidal period cycled prior to striking any particular point on a target object (e.g., an environment).

FIG. 11 illustrates an example of a de-aliasing interval image 1100 that may be generated by the ML component. It will be appreciated, however, that an actual image need not be generated by the ML component. Instead, the data may simply be generated without generating an actual image.

In FIG. 11, the de-aliasing interval image 1100 includes a number of different intervals, such as interval 1105, interval 1110, and interval 1115. While only three intervals are labeled, it will be appreciated that any number of intervals may be generated. In fact, in FIG. 11, there are a total of 8 different intervals, where each interval corresponds to a different grey tone in the figure. As described earlier, each interval corresponds to a number of times the emitted sinusoid's period wrapped, cycled, or repeated. For instance, interval 1105 corresponds to wrap 805 from FIG. 8, interval 1110 corresponds to wrap 810, and interval 1115 corresponds to wrap 815.

With reference to FIG. 3B, interval 1105 may correspond to a first wrapping (e.g., spanning the actual distance between 0 m and 1 m in FIG. 3B), interval 1110 may correspond to a second wrapping (e.g., spanning the actual distance between 1 m and 2 m in FIG. 3B), interval 1115 may correspond to a third wrapping (e.g., spanning the actual distance between 2 m and 3 m in FIG. 3B), and so on. Accordingly, the de-aliasing intervals correspond to the length of the sinusoid's period and may be represented as an integer value (e.g., interval 1105 may have an interval integer value of 0, interval 1110 may have an interval integer value of 1, and interval 1115 may have an interval integer value of 2) or as some other representative indicator. As an additional example, any objects located in interval 1115 will have a depth distance of 2 meters plus their specific depth within interval 1115. For instance, object 345 in FIG. 3B has a depth distance of 3 meters plus its specific depth within that fourth interval, which specific depth is 0.3 meters. Consequently, object 345 has a depth of 3.3 meters, which is a combined value of the de-aliasing interval value and the specific depth within that de-aliasing interval.

Figure 12:
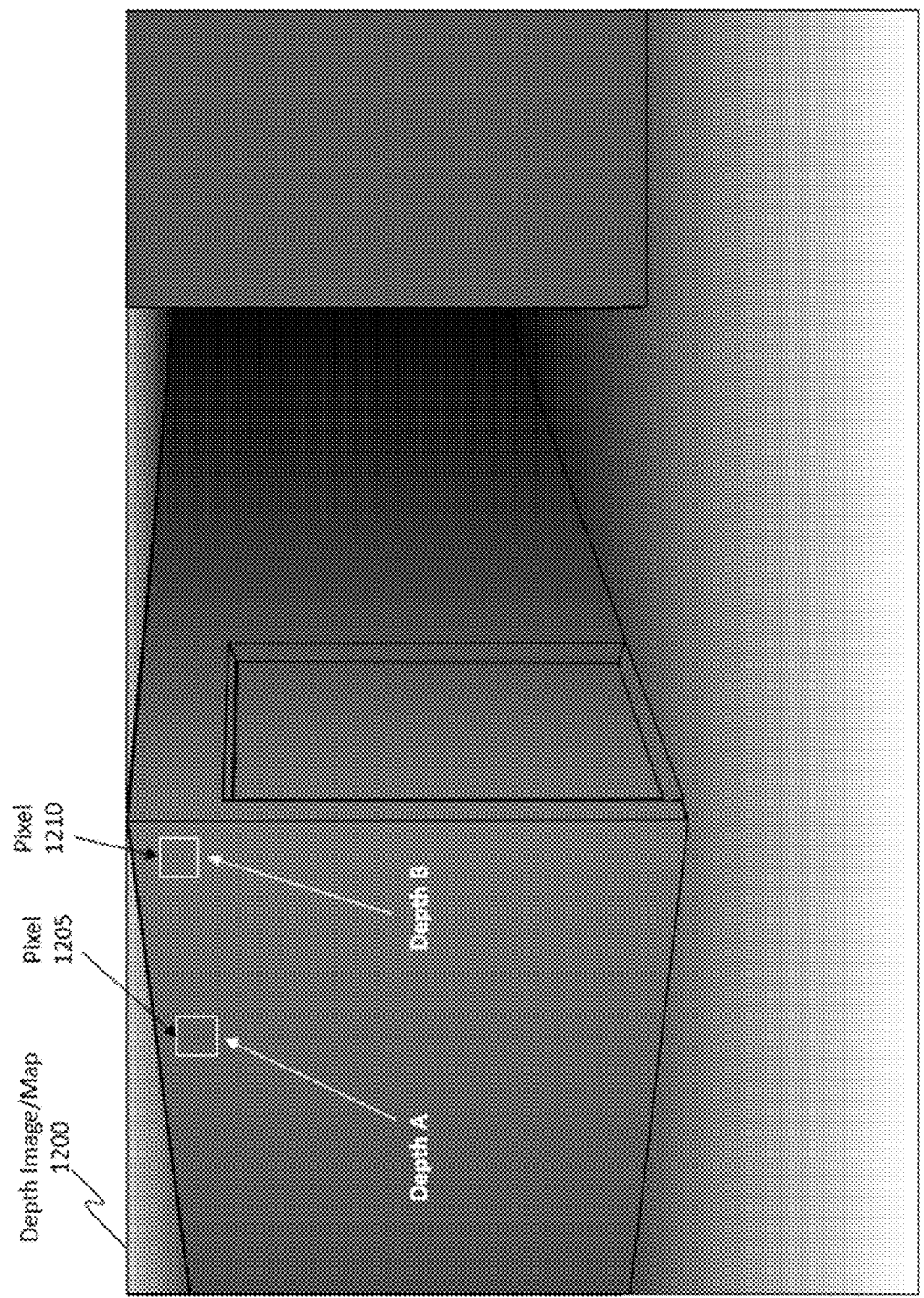
FIG. 12 illustrates how, by combining the data from a phase image as well as the de-aliasing intervals provided by the ML component, the ambiguities within the phase image can be de-aliased so as to produce an accurate depth map/surface mesh.

Returning to FIG. 6, method 600 then includes an act 625 of generating a depth map based on the phase image and any resulting de-aliasing intervals generated by the machine learning component. FIG. 12 illustrates an example of a depth image/map 1200, which is representative of the depth map described in method act 625. Depth image/map 1200 specifically calls out two pixels, namely pixel 1205 and pixel 1210, which correspond to pixels 1120 and 1125 from FIG. 11 and pixels 820 and 825 from FIG. 8 and which correspond to specific locations on wall 705 of FIG. 7.

In accordance with the disclosed principles, the embodiments are able to de-alias ambiguities by using a phase image in conjunction with de-aliasing intervals determined by a ML component. The resulting depth map, therefore, accurately reflects the true depth of objects within an environment, even if those specific objects share a same phase shift value. For instance, even though the wall objects corresponding to pixels 1205 and 1210 share a same phase shift value, as described above, those two pixels are assigned different depth values, as shown by "Depth A" for pixel 1205 and a different "Depth B" for pixel 1210. Accordingly, method 600 can be performed to de-alias phase ambiguities within phase images.

Figure 13:
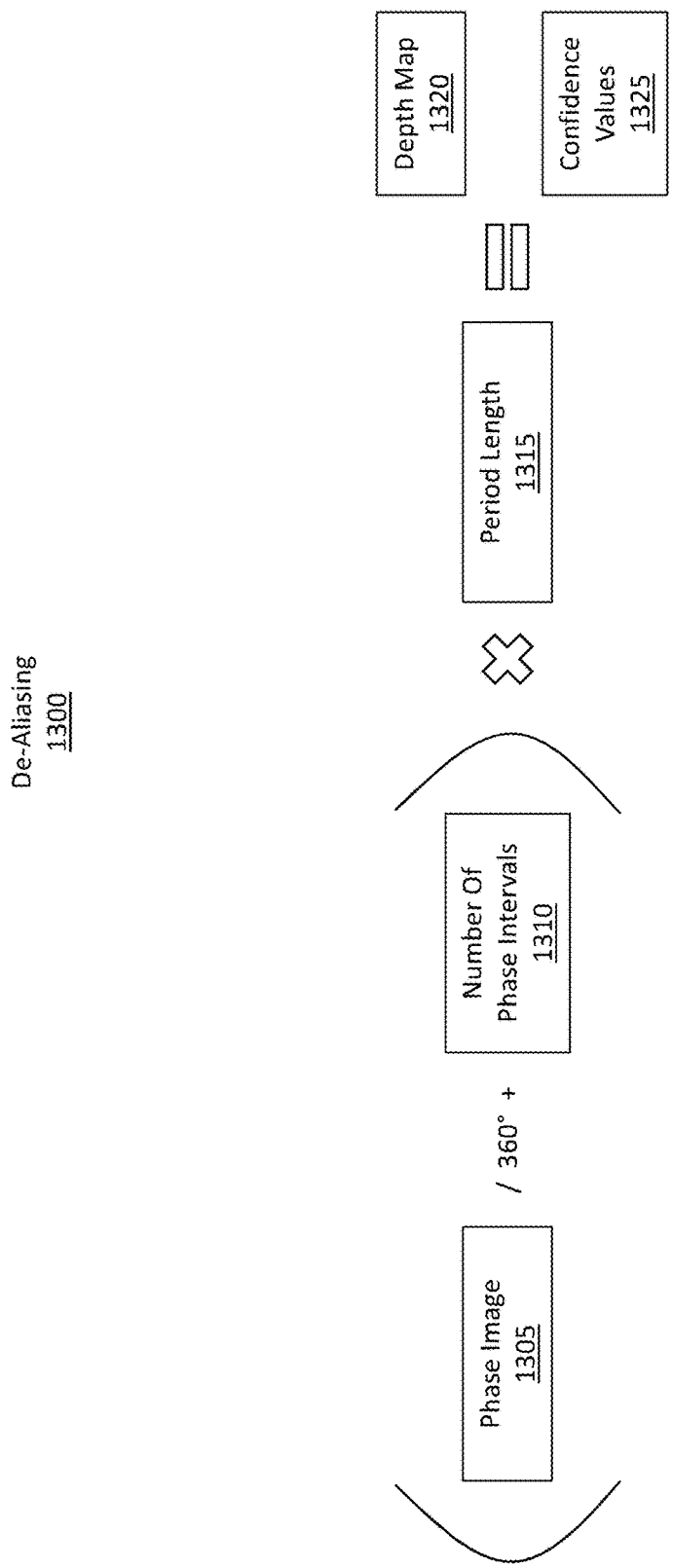
FIG. 13 illustrates an example process for combining the data from a phase image as well as the de-aliasing intervals provided by the ML component to generate an accurate depth map/surface mesh, as well as potentially a set of one or more confidence values indicating an accuracy for those de-aliasing intervals or perhaps an accuracy for the resulting depth determinations found within the depth map.

Attention will now be directed to FIG. 13, which illustrates a specific example of a de-aliasing 1300 operation. It will be appreciated that phase is only a precursor to depth because of the ambiguity (i.e. multiple depths have the same phase shift value). To understand that, assume an object has a depth of 0 millimeters (mm). In this case, the emitted and reflected sine waves perfectly overlap and the phase will be 0°.

Now, if the depth of the object were gradually increased, the resulting phase shift values will progressively increase as well (e.g., the unit circle 300 will be traversed in a counterclockwise manner). As the distance increases, the phase shift value approaches 360° and the two sine waves (i.e. the reference and reflected light) start overlapping again, which resets the phase shift value to 0°.

In this example, assume that a phase of 360° corresponds to 1000 mm. The actual distance corresponding to a phase of 360° can be referred to as a "warping distance" (or the "period") and is dependent on the chosen period of the sine wave. In this example of using a warping distance of 1000 mm, depths of 250 mm, 1250 mm, 2250 mm, and so on all lead to the same phase shift value of 90°, which means the system cannot directly convert from phase to depth. To accomplish this conversion, the system determines how many period wraps or "intervals" already happened using the disclosed ML component.

More formally, the system computes depth in accordance with the algorithm shown in FIG. 13. Here, (phase/360°+ number phase wraps)*warping distance determines depth. In FIG. 13, the phase is obtained from the phase image 1305, the number of phase wraps is determined from the number of phase intervals 1310 (as determined by the ML component), and the warping distance is determined based on the period length 1315. This algorithm allows the system to generate a depth map 1320 as well as confidence values 1325 for each of the de-aliasing intervals and/or the resulting depth. Some embodiments are additionally triggered to provide an alert when the confidence values 1325 are below a particular threshold. This alert may inform a user that additional training or training data is perhaps needed for the ML component. As such, the alert can prompt the user to provide the needed training or training data.

Accordingly, the disclosed embodiments provide numerous benefits and advantages by de-aliasing phase ambiguities within an IR phase image. These benefits are achieved, at least in part, by using a ML component to determine period wrapping intervals and then using those intervals in conjunction with a phase image to generate a depth map.

Example Computer System(s)

Figure 14:
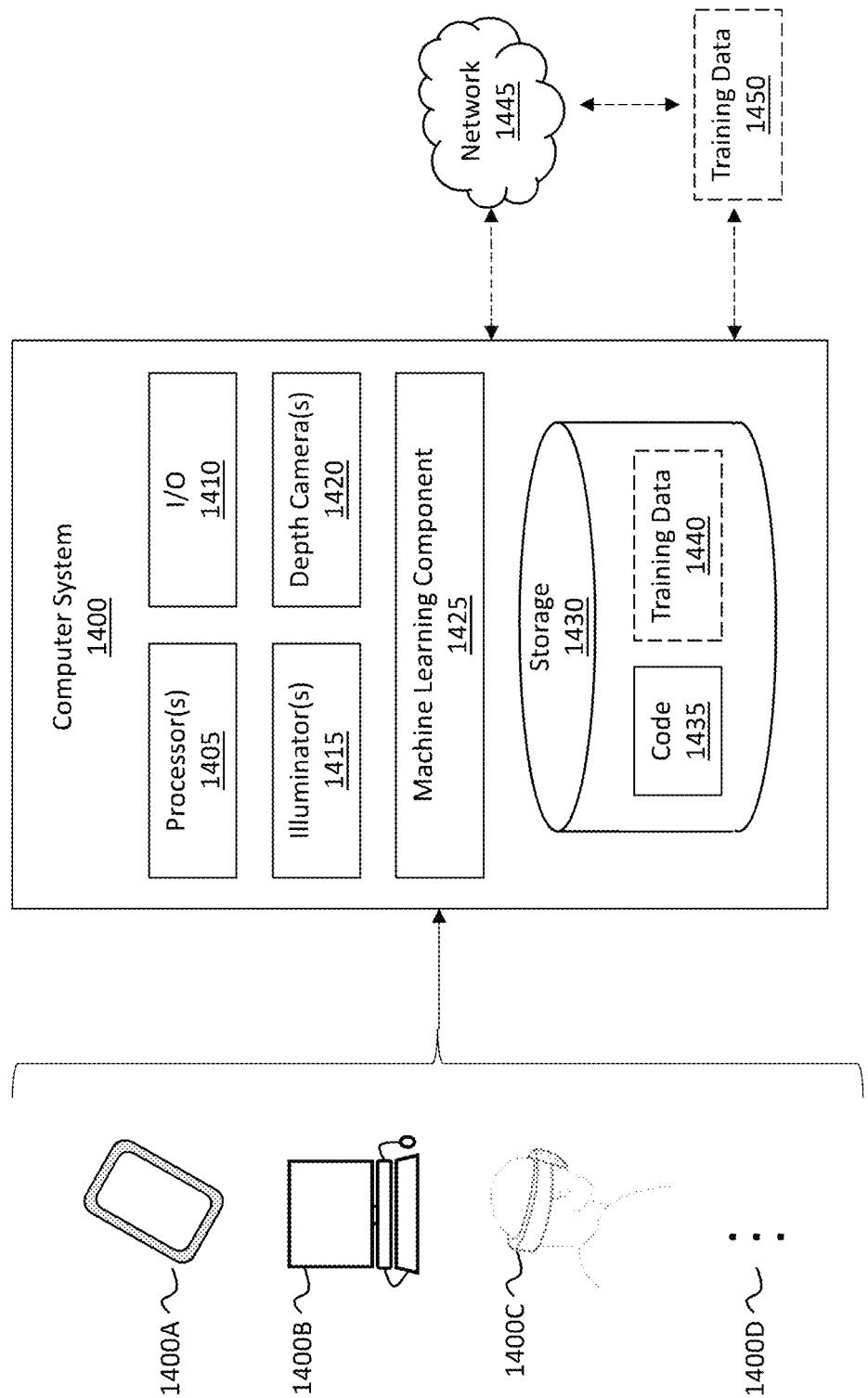
FIG. 14 illustrates an example computer system specially configured to perform any of the disclosed operations and/or specially configured to include any of the disclosed hardware units.

Attention will now be directed to FIG. 14 which illustrates an example computer system 1400 that may be used to facilitate the operations described herein. In particular, this computer system 1400 may be in the form of the MR systems that were described earlier.

Computer system 1400 may take various different forms. For example, in FIG. 14, computer system 1400 may be embodied as a tablet 1400A, a desktop 1400B, or an HMD 1400C. The ellipsis 1400D demonstrates that computer system 1400 may be embodied in any form. Computer system 1400 may also be a distributed system that includes one or more connected computing components/devices that are in communication with computer system 1400, a laptop computer, a mobile phone, a server, a data center, and/or any other computer system. The ellipsis 1400D also indicates that other system subcomponents may be included or attached with the computer system 1400, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, automated or self-driving vehicles, or any type of mobile phone.

Figure 15:
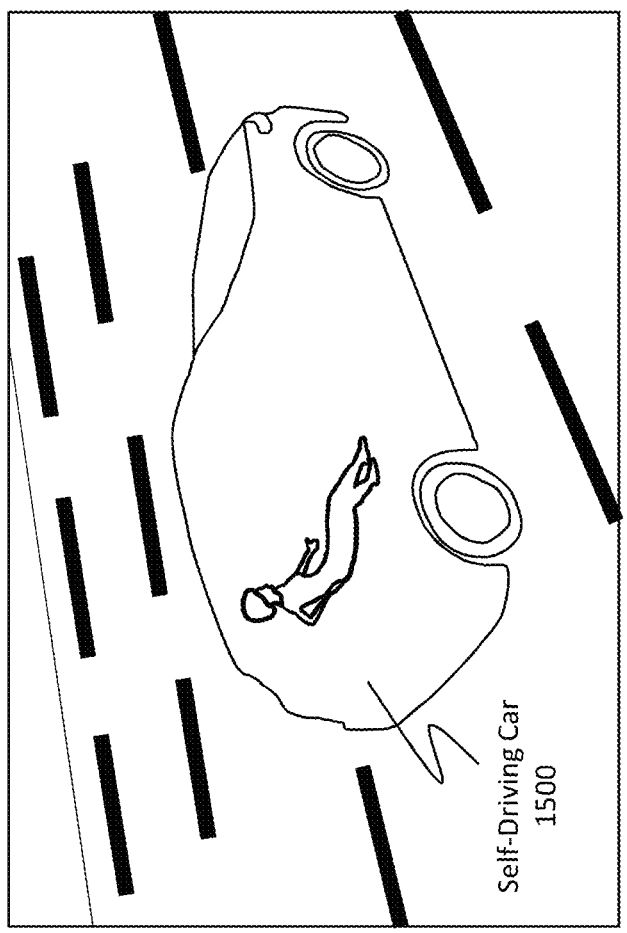
FIG. 15 illustrates a scenario in which the disclosed embodiments can be used in the context of other depth-determining scenarios besides HMD scenarios, such as in scenarios involving self-driving or automated vehicles.

Turning briefly to FIG. 15, the disclosed embodiments can also be used in scenarios different from HMD-based scenarios. Indeed, the disclosed embodiments can be used in any scenario in which it is beneficial to identify depth. One such example scenario includes that shown in FIG. 15 in which a self-driving car 1500 relies on depth information to avoid obstacles. That is, the self-driving car 1500 can acquire depth information when driving, and the depth information may be obtained in the manner disclosed herein. As such, even applications involving autonomous vehicles can be benefited by the disclosed operations.

Returning to FIG. 14, in its most basic configuration, computer system 1400 includes various different components. FIG. 14 shows that computer system 1400 includes at least one processor 1405 (aka a "hardware processing unit"), input/output ("I/O") 1410, illuminator(s) 1415, depth camera(s) 1420, a machine learning component 1425, and storage 1430. The illuminators 1415 (such as illuminator 105 from FIG. 1) and depth camera(s) 1420 (e.g., detector 125 from FIG. 1) may be included together as a depth estimator, such as depth estimator 200 from FIG. 2.

Depth camera(s) 1420 may include any number of ToF flight cameras as described earlier as well as any number of active or passive stereoscopic cameras, and/or any other type of depth cameras. Using these cameras, computer system 1400 is able to capture images of an environment and generate a 3D representation of that environment in the form of a surface mesh. Accordingly, computer system 1400 includes any hardware and/or software components necessary to generate a surface mesh/spatial mapping (which may include depth images/maps, 3D dot/point clouds, and/or 3D meshes) and may perform the operations described herein.

Storage 1430 is shown as including executable code/instructions 1435 and training data 1440 (e.g., representative of the training data discussed earlier). The executable code/instruction 1435 represent instructions that are executable by the computer system to perform the disclosed operations, such as those described in method 600 of FIG. 6.

Storage 1430 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well. As used herein, the term "executable module," "executable component," or even "component" can refer to software objects, routines, or methods that may be executed on computer system 1400. The different components, modules, engines, and services described herein may be implemented as objects or processors that execute on computer system 1400 (e.g. as separate threads).

The disclosed embodiments may comprise or utilize a special-purpose or general-purpose computer including computer hardware, such as, for example, one or more processors (such as processor 1405) and system memory (such as storage 1430), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras, accelerometers, gyroscopes, acoustic sensors, magnetometers, etc.). Further, computer system 1400 may also be connected through one or more wired or wireless networks 1445 to remote/separate computer systems(s) that are configured to perform any of the processing described with regard to computer system 1400. Additionally, training data 1450 located at a remote site may be accessible by the computer system 1400 so as to train the machine learning component 1425. As such, computer system 1400 need not locally store training data.

During use, a user of computer system 1400 is able to perceive information (e.g., a MR environment (including VR or AR)) through a display screen that is included with the I/O 1410 of computer system 1400 and that is visible to the user. The I/O 1410 and sensors with the I/O 1410 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor 1405, to render one or more virtual objects within a mixed-reality environment. As a result, the virtual objects accurately move in response to a movement of the user and/or in response to user input as the user interacts within the virtual scene.

A "network," like the network 1445 shown in FIG. 14, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1445. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1405). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that de-aliases depth ambiguities included within a phase image, the computer system comprising:
   at least one processor; and
   at least one hardware storage device that stores instructions that are executable by the at least one processor to cause the computer system to:
      access a phase image comprising phase differences that represent changes in depth within overlapping sinusoidal periods occurring between a reference light and a reflected light, the phase image including ambiguities that occur as a result of multiple different depths represented by the phase image sharing a same phase difference value;
      cause a machine learning component to de-alias the ambiguities by determining de-aliasing intervals for different sinusoidal periods included in the phase image; and
      generate a depth map based on the phase image and any resulting de-aliasing intervals generated by the machine learning component.

2. The computer system of claim 1, wherein generating the depth map based on the phase image and any resulting de-aliasing intervals generated by the machine learning component includes computing depth based on the phase image, a number of phase wraps determined from the resulting de-aliasing intervals, and a warping distance that is determined based on period length of the reference light.

3. The computer system of claim 1, wherein generating the depth map based on the phase image and any resulting de-aliasing intervals generated by the machine learning component includes computing depth based on (i) a phase value, which is obtained from the phase image, (ii) a number of phase wraps, which is determined from the resulting de-aliasing intervals, and (iii) a warping distance, which is determined based on period length of the reference light.

4. The computer system of claim 1, wherein the machine learning component determines a respective de-aliasing interval for each pixel in the phase image, and
   wherein each pixel's corresponding de-aliasing interval represents a number of times the reference light sinusoidally wrapped in period between an illuminator and a corresponding point on a target object corresponding to each said pixel.

5. The computer system of claim 4, wherein multiple de-aliasing intervals are generated by the machine learning component as a result of the reference light wrapping more than one time prior to striking any point on the target object.

6. The computer system of claim 1, wherein the reference light comprises a pulsed ray of sinusoidal illumination light having a particular period,
   wherein the reference light comprises two or more pulsed rays of the sinusoidal illumination light, each having the particular period, and
   wherein a separate phase image is generated for each one of the two or more pulsed rays.

7. The computer system of claim 1, wherein a sinusoidal period of the reference light is within a range between 0.25 meters and 1.75 meters.

8. The computer system of claim 1, wherein a first additional input to the machine learning component is an active brightness image that is generated in conjunction with the phase image and is generated using the reference light and the reflected light.

9. The computer system of claim 8, wherein a second additional input to the machine learning component is a red, green, blue (RGB) color image that is generated in conjunction with the phase image.

10. The computer system of claim 1, wherein the machine learning component determines a respective de-aliasing interval for each pixel in the phase image,
    wherein each pixel's corresponding de-aliasing interval represents a number of times the reference light sinusoidally wrapped in period between an illuminator and a corresponding point on a target object corresponding to each said pixel, and
    wherein the machine learning component also generates a corresponding confidence value for each pixel's corresponding de-aliasing interval.

11. A method for de-aliasing depth ambiguities included within infrared depth images, the method comprising:
    accessing a phase image that was generated based on detected phase differences, the phase differences representing changes in depth within overlapping sinusoidal periods between a reference light and a reflected light, the phase image including ambiguities as a result of multiple different depths represented by the phase image sharing a same phase difference value;
    causing a machine learning component to de-alias the ambiguities in the phase image by determining, for each pixel in the phase image, a corresponding de-aliasing interval; and
    generating a depth map based on the phase image and any resulting de-aliasing intervals generated by the machine learning component.

12. The method of claim 11, wherein the machine learning component generates a de-aliasing interval image illustrating each pixel's corresponding de-aliasing interval.

13. The method of claim 11, wherein the reference light comprises two or more pulsed rays of sinusoidal illumination light, each having a common or a different sinusoidal period, and wherein a separate phase image is generated for each one of the two or more pulsed rays.

14. The method of claim 13, wherein the two or more pulsed rays of sinusoidal illumination light include three pulsed rays such that at least three separate phase images are generated.

15. The method of claim 13, wherein each of the two or more pulsed rays of sinusoidal illumination light has a common sinusoidal period.

16. The method of claim 13, wherein each of the two or more pulsed rays of sinusoidal illumination light has a different sinusoidal period.

17. The method of claim 11, wherein a frequency of the reference light is within a range between 10 MHz and 450 MHz.

18. The method of claim 11, wherein the machine learning component additionally semantically identifies a target object.

19. A computer system that de-aliases depth ambiguities included within a phase image, the computer system comprising:

at least one processor; and
at least one hardware storage device that stores instructions that are executable by the at least one processor to cause the computer system to:
    access a phase image that was generated based on detected phase differences, the phase differences representing changes in depth within overlapping sinusoidal periods between a reference light and a reflected light, the phase image including ambiguities as a result of multiple different depths represented by the phase image sharing a same phase difference value;
    feed the phase image as input to a machine learning component configured to de-alias the ambiguities by determining, for each pixel in the phase image, a corresponding de-aliasing interval; and
    generate a depth map based on the phase image and any resulting de-aliasing intervals generated by the machine learning component.

20. The computer system of claim 19, wherein the machine learning component is provided with filtering criteria, and wherein the machine learning component, after filtering the phase image based on the filtering criteria, determines de-aliasing intervals for any objects that were not filtered.

* * * * *